(12) United States Patent
Dyllick-Brenzinger et al.

(10) Patent No.: US 8,461,235 B2
(45) Date of Patent: *Jun. 11, 2013

(54) USE OF POLYMER POWDER CONTAINING UV ABSORBER FOR THE STABILISATION OF POLYMERS AGAINST THE EFFECTS OF UV RADIATION

(75) Inventors: Rainer Dyllick-Brenzinger, Speyer (DE); Oliver Koch, Bad Duerkheim (DE); Dirk Wulff, Schifferstadt (DE); Alban Glaser, Mannheim (DE)

(73) Assignee: BASF SE, Ludwigshafen (DE)

( * ) Notice: Subject to any disclaimer, the term of this patent is extended or adjusted under 35 U.S.C. 154(b) by 323 days.

This patent is subject to a terminal disclaimer.

(21) Appl. No.: 12/756,061

(22) Filed: Apr. 7, 2010

(65) Prior Publication Data
US 2010/0190929 A1    Jul. 29, 2010

Related U.S. Application Data

(63) Continuation of application No. 10/535,860, filed as application No. PCT/EP03/12560 on Nov. 11, 2003, now Pat. No. 7,728,057.

(30) Foreign Application Priority Data

Nov. 21, 2002  (DE) .................................. 102 54 548

(51) Int. Cl.
*C08K 5/53*    (2006.01)

(52) U.S. Cl.
USPC ........... 524/130; 524/110; 524/133; 524/236; 524/323

(58) Field of Classification Search
USPC .......................... 524/110, 130, 133, 236, 323
See application file for complete search history.

(56) References Cited

U.S. PATENT DOCUMENTS

| | | |
|---|---|---|
| 3,330,859 A | 7/1967 | Dexter et al. |
| 3,960,928 A | 6/1976 | Mauz |
| 4,325,863 A | 4/1982 | Hinsken et al. |
| 4,338,244 A | 7/1982 | Hinsken et al. |
| 5,053,444 A | 10/1991 | Trotoir |
| 5,175,312 A | 12/1992 | Dubs et al. |
| 5,216,052 A | 6/1993 | Nesvadba et al. |
| 5,252,643 A | 10/1993 | Nesvadba |
| 2001/0008633 A1 | 7/2001 | Travkina et al. |
| 2002/0131941 A1 | 9/2002 | Habeck et al. |

FOREIGN PATENT DOCUMENTS

| | | |
|---|---|---|
| DE | 37 25 926 | 2/1989 |
| DE | 43 16 611 | 11/1993 |
| DE | 43 16 622 | 11/1993 |
| DE | 43 16 876 | 11/1993 |
| DE | 44 42 123 | 5/1996 |
| EP | 0 162 523 | 11/1985 |
| EP | 0 182 415 | 5/1986 |
| EP | 0 589 839 | 3/1994 |
| EP | 0 591 102 | 4/1994 |
| EP | 0 714 938 | 6/1996 |
| EP | 0 885 924 | 12/1998 |
| EP | 1 092 416 | 4/2001 |
| EP | 1 919 041 | 3/2002 |
| WO | 99/40123 | 8/1999 |
| WO | 00/18846 | 4/2000 |
| WO | 01/53393 | 7/2001 |

OTHER PUBLICATIONS

Cosmetic Legislation, vol. 1, Cosmetic Products, European Commission 1999, pp. 64-66.

*Primary Examiner* — Edward Cain
(74) *Attorney, Agent, or Firm* — Oblon, Spivak, McClelland, Maier & Neustadt, L.L.P.

(57) ABSTRACT

The present invention relates to the use, for stabilizing polymers, in particular polyolefins, with respect to exposure to UV radiation, of fine-particle polymer powders comprising at least one UV absorber. The present invention further relates to stabilizer mixtures for stabilizing polymers with respect to exposure to UV radiation, oxygen and heat, which, inter alia, comprise these polymer powders, and to a process for stabilizing polymers, in particular polyolefins, with respect to exposure to UV radiation, oxygen and heat, which comprises adding, to the polymers, in particular to the polyolefins, an effective amount of these stabilizers. The present invention further relates to polymers, in particular polyolefins, which have been stabilized with respect to exposure to UV radiation or with respect to exposure to UV radiation, oxygen and heat, which comprise an effective amount of these polymer powders or, respectively, stabilizer mixtures, and to articles produced from these stabilized polymers, in particular polyolefins.

8 Claims, No Drawings

USE OF POLYMER POWDER CONTAINING UV ABSORBER FOR THE STABILISATION OF POLYMERS AGAINST THE EFFECTS OF UV RADIATION

The present invention relates to the use, for stabilizing polymers, in particular polyolefins, with respect to exposure to UV radiation, of fine-particle polymer powders comprising at least one UV absorber.

The present invention further relates to stabilizer mixtures for stabilizing polymers with respect to exposure to UV radiation, oxygen and heat, which, inter alia, comprise these polymer powders, and to a process for stabilizing polymers, in particular polyolefins, with respect to exposure to UV radiation, oxygen and heat, which comprises adding, to the polymers, in particular to the polyolefins, an effective amount of these stabilizer mixtures.

The present invention further relates to polymers, in particular polyolefins, which have been stabilized with respect to exposure to UV radiation or with respect to exposure to UV radiation, oxygen and heat, and which comprise an effective amount of these polymer powders or, respectively, stabilizer mixtures, and to articles produced from these stabilized polymers, in particular polyolefins.

The incorporation of UV absorbers in order to stabilize polymers with respect to damaging exposure to UV radiation is a very general practice in the plastics-processing industry. Important factors here for longlasting protection are not only the long-term stability of the UV absorbers but also the stable dispersion of these in the polymer. This depends mainly on the compatibility of the UV absorber with the polymer used. If this is low, the consequence, in particular at the elevated temperatures encountered during processing, is very often undesired migration of the stabilizer to the polymer surface with resultant non-uniform stabilization of the polymer composition.

It is an object of the present invention, therefore, to provide appropriate UV absorbers which are stable with respect to migration when incorporated into polymers and therefore bring about uniform stabilization of the polymer composition.

We have found that this object is achieved by way of fine-particle polymer powders comprising at least one UV absorber.

Stabilizer mixtures have also been found, which comprise
(a) at least one polymer powder which comprises at least one UV absorber,
and at least one other component selected from the group consisting of:
(b) at least one compound selected from the group consisting of organic phosphites, organic phosphines, and organic phosphonites,
(c) at least one compound selected from the group consisting of sterically hindered phenols,
(d) at least one compound selected from the group consisting of sterically hindered amines,
(e) at least one compound selected from the group of the chromanes, and
(f) at least one organic or inorganic salt selected from the group consisting of zinc salts, calcium salts, magnesium salts, cerium salts, iron salts and manganese salts.

The polymer powders comprising UV absorbers are usually obtainable via the intermediate stage of a polymer dispersion obtained through emulsion polymerization of a microemulsion, with a subsequent drying step. The preparation of colorant-containing polymer dispersions and of corresponding colorant-containing polymer powders is described in the specifications WO 99/40123, WO 00/18846, EP 1 092 416 A2, and EP 1 191 041 A2. In the last two of these specifications, colorants in the broader sense includes UV absorbers. In the specifications EP 1 092 416 A2 and EP 1 191 041 A2, polymers comprising these UV absorbers are used to formulate cosmetic compositions.

The abovementioned specifications and the literature cited therein are therefore expressly incorporated herein by way of reference in relation to the preparation of the polymer powders which comprise at least one UV absorber and which are to be used according to the invention to stabilize polymers with respect to exposure to UV radiation. Particular specifications incorporated are EP 1 092 416 A2 and EP 1 191 041 A2, the descriptions in paragraphs [0006]-[0084] and [0111]-[0133], in particular [0129]-[0133] being of relevance in the first of these, and the descriptions in paragraphs [0006]-[0077] and [0100]-[0102] being of relevance in the second of these.

For the purposes of the present invention, the meaning of the expression that the polymer powders "comprise" the UV absorber(s) is that the UV absorber(s) may either have homogeneous distribution in molecular or microcrystalline form in the polymer matrix (to which reference is also made by way of example in lines 25-29 on page 3 of the specification WO 00/18846), or else has been completely or merely partially encapsulated by the polymer matrix. ("UV absorber" is used hereinafter in the singular even if according to the invention more than one UV absorber may be present in the polymer powder.)

The sense of what has been said above is therefore that it is not essential that the UV absorber be (at least partially) soluble in the starting monomers used to prepare the polymer dispersions. It merely has to be wettable by the starting monomers or have been enclosed (at least partially) by the monomer droplets during the emulsion polymerization, and must have a suitable particle size distribution.

Clearly, chemical modification of the UV absorber via introduction of substituents can be used to improve its wettability or solubility by the starting monomers. For the most important case arising in industry, where the starting monomers have little or no polarity, the UV absorber may, if necessary, be chemically modified using lipophilic radicals, as described in paragraphs [0012]-[0015] of the specification EP 1 092 416 A2.

UV absorbers which may be used in the polymer powders are:
4-aminobenzoic acid and its derivatives, in particular esters thereof, e.g. (ethoxylated) ethyl 4-aminobenzoate or 2-ethylhexyl-4,4-dimethylaminobenzoic acid;
benzoates and salicylates, e.g. phenyl salicylate, 4-isopropylbenzyl salicylate, 4-tert-butylphenyl salicylate, octylphenyl salicylate, benzoylresorcinol, bis(4-tert-butylbenzoyl)-resorcinol, dibenzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate;
substituted acrylates, e.g. ethyl or isooctyl α-cyano-β,β-diphenylacrylate (mainly 2-ethylhexyl α-cyano-β,β-diphenylacrylate), methyl α-methoxycarbonyl-β-phenylacrylate, methyl α-methoxycarbonyl-β-(p-methoxyphenyl)acrylate, methyl or butyl α-cyano-β-methyl-β-(p-methoxyphenyl) acrylate, N-(β-methoxycarbonyl-β-cyanovinyl)-2-methylindoline, octyl p-methoxycinnamate, isopentyl 4-methoxycinnamate, urocanic acid and its salts and esters;
2-hydroxybenzophenone derivatives, e.g. 4-hydroxy-, 4-methoxy-, 4-octyloxy-, 4-decyloxy-, 4-dodecyloxy-, 4-benzyloxy-, 4,2',4'-trihydroxy-, 2'-hydroxy-4,4'-dimethoxy-2-hydroxybenzophenone, and also sodium 4-methoxy-2-hydroxybenzophenone-sulfonate;

esters of 4,4-diphenylbutadiene-1,1-dicarboxylic acid, e.g. the bis(2-ethylhexyl)ester;

2-phenylbenzimidazole-4-sulfonic acid, and also 2-phenylbenzimidazole-5-sulfonic acid, and salts thereof;

derivatives of benzoxazoles;

derivatives of benzotriazoles and 2-(2'-hydroxyphenyl)-benzotriazoles, e.g. 2-(2H-benzotriazol-2-yl)-4-methyl-6-(2-methyl-3-((1,1,3,3-tetramethyl-1-(trimethylsilyloxy)-disiloxanyl)propyl)phenol, 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl) benzotriazole, 2-[2'-hydroxy-5'-(1,1,3,3-tetramethylbutyl) phenyl]benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)benzotriazole, 2-(3',5'-di-tert-amyl-2'-hydroxyphenyl)benzotriazole, 2-[3',5'-bis(α,α-dimethylbenzyl)-2'-hydroxyphenyl]benzotriazole, 2-[3'-tert-butyl-2'-hydroxy-5'-(2-octyloxycarbonylethyl)phenyl]-5-chlorobenzotriazole, 2-[3'-tert-butyl-5'-(2-(2-ethylhexyloxy)-carbonylethyl)-2'-hydroxyphenyl]-5-chlorobenzotriazole, 2[3'-tert-butyl-2'-hydroxy-5'-(2-methoxycarbonylethyl)phenyl]-5-chlorobenzotriazole, 2-[3'-tert-butyl-2'-hydroxy-5'-(2-methoxycarbonylethyl) phenyl]benzotriazole, 2-[3'-tert-butyl-2'-hydroxy-5'-(2-octyloxycarbonylethyl)phenyl]benzotriazole, 2-[3'-tert-butyl-5'-(2-(2-ethylhexyloxy)carbonylethyl)-2'-hydroxyphenyl] benzotriazole, 2-(3'-dodecyl-2'-hydroxy-5'-methylphenyl) benzotriazole, 2-[3'-tert-butyl-2'-hydroxy-5'-(2-isooctyloxycarbonylethyl)phenyl]benzotriazole, 2,2'-methylenebis[4-(1,1,3,3-tetramethylbutyl)-6-benzotriazol-2-yl-phenol], the fully esterified product of 2-[3'-tert-butyl-5'-(2-methoxycarbonylethyl)-2'-hydroxyphenyl]-2H-benzotriazole with polyethylene glycol 300, [R—CH$_2$CH$_2$—COO(CH$_2$)$_3$—]$_2$, where R is 3'-tert-butyl-4-hydroxy-5'-2H-benzotriazol-2-ylphenyl, 2-[(2'-hydroxy-3'-(α,α-dimethylbenzyl)-5'-(1,1,3,3-tetramethylbutyl)phenyl] benzotriazole, 2-[2'-hydroxy-3'-(1,1,3,3-tetramethylbutyl)-5'-(α,α-dimethylbenzyl)phenyl]benzotriazole;

benzylidenecamphor and its derivatives as mentioned by way of example in DE-A 3 836 630, e.g. 3-benzylidenecamphor, 3-(4'-methylbenzylidene)-dl-camphor;

α-(2-oxoborn-3-ylidene)toluene-4-sulfonic acid and its salts, N,N,N-trimethyl-4-(2-oxoborn-3-ylidenemethyl)anilinium methosulfate;

dibenzoylmethanes, e.g. 4-tert-butyl-4'-methoxydibenzoylmethane;

2,4,6-triaryltriazine compounds, e.g. 2,4,6-tris{N-[4-(2-ethylhex-1-yl)oxycarbonylphenyl]amino}-1,3,5-triazine, 4,4'-((6-(((tert-butyl)aminocarbonyl)phenylamino)-1,3,5-triazine-2,4-diyl)imino)bis(2'-ethylhexylbenzoate); and 2-(2-hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis-(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1, 3,5-triazine, 2-(2-hydroxy-4-tridecyloxyphenyl)-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]-phenyl}-4,6-bis(2,4-dimethylphenyl)-1,3,5-triazine.

Other suitable UV absorbers may be found in the publication Cosmetic Legislation, Vol. 1, Cosmetic Products, European Commission 1999, pp. 64-66, hereby incorporated herein by way of reference.

The polymer powders used which comprise UV absorbers preferably have a polymer particle size ≦500 nm.

Whether or not use is made of the embodiment described above, it is preferable to use polymer powders which comprise from 0.5 to 50% by weight of the at least one UV absorber, based on the weight of the polymer matrix.

Preferred stabilizer mixtures comprising component (a) and one or more of components (b) to (f) are those which comprise at least one polymer powder (a) whose polymer particle size is ≦500 nm.

Whether or not use is made of the embodiment described above, other preferred stabilizer mixtures comprise at least one polymer powder(s) which comprises from 0.5 to 50% by weight of the at least one UV abosrber, based on the weight of the polymer matrix.

Component (b), which is a possible constituent in the stabilizer mixtures of the invention, preferably comprises at least one organic phosphite, organic phosphine, or organic phosphonite selected from the group of the compounds of the formulae (VI) to (XV):

(VI)

(VII)

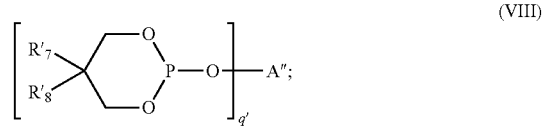
(VIII)

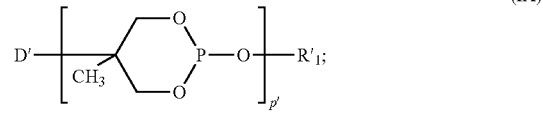
(IX)

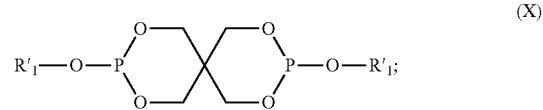
(X)

-continued

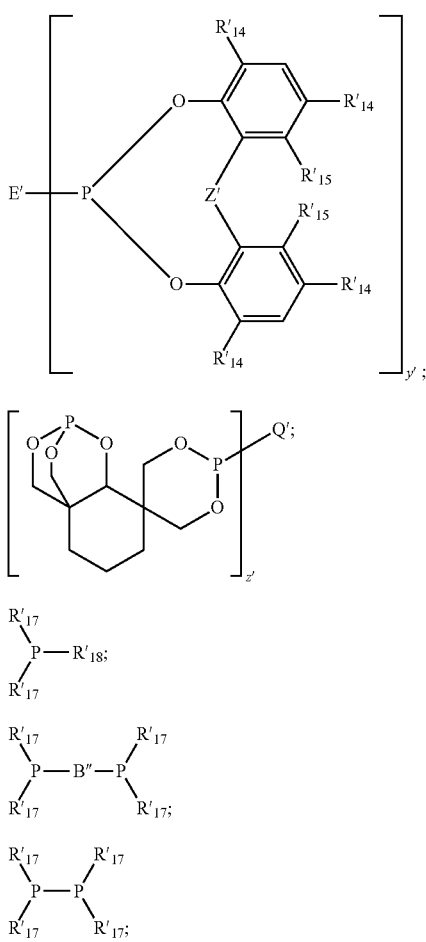
(XI)

(XII)

(XIII)

(XIV)

(XV)

where
n' is 2, 3 or 4;
p' is 1 or 2;
q' is 2 or 3;
r' is an integer from 4 to 12;
y' is 1, 2 or 3;
z' is an integer from 1 to 6;
A' for n' equal to 2 is a $C_2$-$C_{18}$-alkylene group; a $C_2$-$C_{12}$-alkylene group containing an oxygen atom or containing a sulfur atom, or containing an $NR'_4$ group; a group of the formula:

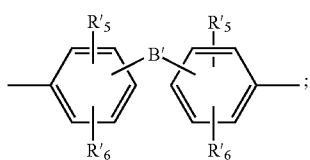

a group of the formula:

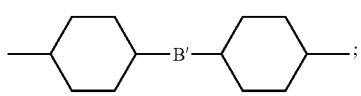

or
a phenylene group;
for n' equal to 3 is a —$C_{r'}H_{2r'-1}$— group, where r' is as defined above; and
for n' equal to 4 is a group of the formula

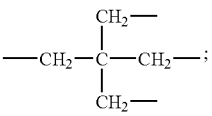

A" for q' equal to 2 or 3 is as defined for A' for n' equal to 2 or 3;
B' is a single chemical bond; a —$CH_2$—, —$CHR'_4$—, or —$CR'_1R'_4$— group; a sulfur atom, $C_5$-$C_7$-cycloalkylidene; cyclohexylidene substituted with from one to four $C_1$-$C_4$-alkyl groups in the 3-, 4-, and/or 5-position;
B" is $C_1$-$C_{30}$-alkylene, uninterrupted or interrupted by NH, by N($C_1$-$C_{24}$-alkyl), by P($C_1$-$C_{24}$-alkyl), by oxygen, or by sulfur; mono- or polyunsaturated $C_1$-$C_{30}$-alkylidene, uninterrupted or interrupted by NH, by N($C_1$-$C_{24}$-alkyl), by P($C_1$-$C_{24}$-alkyl), by oxygen, or by sulfur; $C_5$-$C_7$-cycloalkylidene, uninterrupted or interrupted by NH, by N($C_1$-$C_{24}$-alkyl), by P($C_1$-$C_{24}$-alkyl), by oxygen, or by sulfur; $C_5$-$C_{24}$-heteroarylene or $C_6$-$C_{24}$-arylene, unsubstituted or substituted by $C_1$-$C_{24}$-alkyl, by $C_3$-$C_{12}$-cycloalkyl, or by $C_1$-$C_{18}$-alkoxy;
D' for p' equal to 1 is a methyl group; and
for p' equal to 2 is a —$CH_2OCH_2$— group;
E' for y' equal to 1 is $C_1$-$C_{24}$-alkyl; an —$OR'_1$ group; or halogen;
for y' equal to 2 is an —O-A"-O— group, where A" is as defined for A' for n' equal to 2; and
for y' equal to 3 is an $R'_4C(CH_2O—)_3$ or $N(CH_2CH_2O—)_3$ group;
Q' is a z'-valent radical of an alcohol or phenol, in each case bonded to the phosphorus atom by way of an oxygen atom;
$R'_1$, $R'_2$ and $R'_3$ independently of one another, are hydrogen; a —$COOR'_4$— or —$CONR'_4R'_4$ group; $C_1$-$C_{24}$-alkyl which contains an oxygen atom or contains a sulfur atom, or contains an —$NR'_4$— group; $C_7$-$C_8$-phenylalkyl; $C_3$-$C_{12}$-cycloalkyl; naphthyl or phenyl, unsubstituted or substituted with halogen or with from one to three $C_1$-$C_{24}$-alkyl, $C_1$-$C_{24}$-alkoxy or $C_7$-$C_9$-phenylalkyl groups; or a group of the formula:

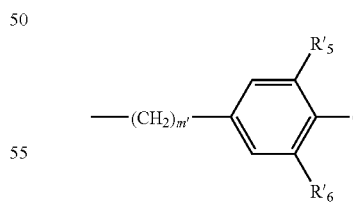

where m' is an integer from 3 to 6;
$R'_4$ is hydrogen; $C_1$-$C_{24}$-alkyl; $C_3$-$C_{12}$-cycloalkyl; $C_7$-$C_9$-phenylalkyl;
$R'_5$ and $R'_6$, independently of one another, are hydrogen; $C_1$-$C_6$-alkyl; $C_5$-$C_6$-cycloalkyl;
$R'_7$ and $R'_8$
for q' equal to 2, independently of one another, are $C_1$-$C_4$-alkyl or, together, a pentamethylene group;
for q' equal to 3 are in each case a methyl group;

$R'_{14}$ is hydrogen; $C_1$-$C_9$-alkyl; cyclohexyl;

$R'_{15}$ is hydrogen; a methyl group;

X' and Y' are a single chemical bond; an oxygen atom;

Z' is a single chemical bond, a methylene group; a —C($R'_{16}$)$_2$— group; a sulfur atom;

$R'_{16}$ is $C_1$-$C_6$-alkyl;

$R'_{17}$ and $R'_{18}$ independently of one another, are hydrogen; $C_1$-$C_{24}$-alkyl, uninterrupted or interrupted by NH, by N($C_1$-$C_{24}$-alkyl), by oxygen, or by sulfur; $C_7$-$C_9$-phenylalkyl; mono- or polyunsaturated $C_2$-$C_{24}$-alkenyl; $C_2$-$C_{24}$-alkynyl; $C_2$-$C_8$-alkoxyalkyl; unsubstituted or substituted $C_3$-$C_{12}$-cycloalkyl; unsubstituted or substituted $C_5$-$C_{24}$-heteroaryl; unsubstituted or substituted $C_6$-$C_{20}$-aryl; $C_1$-$C_{30}$-arylalkyl; $C_2$-$C_{24}$-alkoxy.

Component (b) particularly preferably comprises at least one organic phosphite, organic phosphine, or organic phosphonite selected from the group of the compounds of the formulae (VI), (VII), (X), and (XI), where n' is 2;

y' is 1, 2 or 3;

A' is a $C_2$-$C_{18}$-alkylene group; a p-phenylene group or a p-biphenylene group;

E' for y' equal to 1 is $C_1$-$C_{18}$-alkyl; an —$OR'_1$ group; or fluorine;

for y' equal to 2 is a p-biphenylene group; and for y' equal to 3 is an N(CH$_2$CH$_2$O—)$_3$ group;

$R'_1$, $R'_2$ and $R'_3$, independently of one another, are $C_2$-$C_{18}$-alkyl; $C_7$-$C_9$-phenylalkyl; cyclohexyl; phenyl, unsubstituted or substituted with from one to three $C_1$-$C_{18}$-alkyl groups;

$R'_{14}$ is hydrogen; $C_1$-$C_9$-alkyl;

$R'_{15}$ is hydrogen; a methyl group;

X' is a single chemical bond;

Y' is an oxygen atom;

Z' is a single chemical bond; a —C($R'_{16}$)$_2$— group;

$R'_{16}$ is $C_1$-$C_4$-alkyl.

Other particularly preferred organic phosphites or organic phosphonites of component (b) are those selected from the group of compounds of the formulae (VI), (VII), (X), and (XI), where n' is 2;

y' is 1 or 3;

A' is a p-biphenylene group;

E' for y' equal to 1 is $C_1$-$C_{18}$-alkyl; fluorine;

for y' equal to 3 is an N(CH$_2$CH$_2$O—)$_3$ group;

$R'_1$, $R'_2$, and $R'_3$, independently of one another, are $C_2$-$C_{18}$-alkyl; phenyl substituted with from two to three $C_2$-$C_{12}$-alkyl groups;

$R'_{14}$ is a methyl group or tert-butyl group;

$R'_{15}$ is hydrogen;

X' is a single chemical bond;

Y' is an oxygen atom;

Z' is a single chemical bond; a methylene group; a —CH(CH$_3$)— group.

Other particularly preferred organic phosphites of component (b) are those of the formula (XVI)

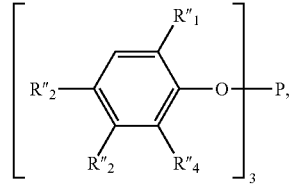

where $R''_1$ and $R''_2$, independently of one another, are hydrogen; $C_1$-$C_8$-alkyl; cyclohexyl; phenyl;

$R''_3$ and $R''_4$, independently of one another, are hydrogen; $C_1$-$C_4$-alkyl.

Examples of phosphites and phosphonites of component (b) are: triphenyl phosphite; diphenyl alkyl phosphites; phenyl dialkyl phosphites; tris(nonylphenyl)phosphite (commercially available with the tradename Alkanox® TNPP; Great Lakes Chemical Corp.); trilauryl phosphite; trioctadecyl phosphite; distearyl pentaerythritol diphosphite; tris(2,4-di-tert-butylphenyl)phosphite (commercially available with the tradename Alkanox® 240; Great Lakes Chemical Corp.); diisodecyl pentaerythritol diphosphite; bis(2,4-di-tert-butylphenyl)pentaerythritol diphosphite (commercially available with the tradename Alkanox® P24; Great Lakes Chemical Corp.); bis(2,6-di-tert-butyl-4-methylphenyl) pentaerythritol diphosphite; bis(2,4-di-tert-butyl-6-methylphenyl)pentaerythritol diphosphite; bis[2,4,6-tris-(tert-butyl)phenyl]pentaerythritol diphosphite; trisstearylsorbitol phosphite; tetrakis(2,4-di-tert-butylphenyl) 4,4'-diphenylenediphosphonite (commercially available with the tradename Alkanox® 24-44; Great Lakes Chemical Corp.); 6-isooctyloxy-2,4,8,10-tetra-tert-butyl-12H-dibenzo[d,g]-1,3,2-dioxaphosphocin; 6-fluoro-2,4,8,10-tetra-tert-butyl-12-methyldibenzo[d,g]-1,3,2-dioxaphosphocin; bis(2,4-di-tert-butyl-6-methylphenyl)methyl phosphite; bis(2,4-di-tert-butyl-6-methylphenyl)ethyl phosphite (commercially available with the tradename Irgafos® 38; Ciba Specialty Chemicals); bis(2,4-dicumylphenyl)pentaerythritol diphosphite, 2,2',2"-nitrilotriethyl tris(3,3',5,5'-tetra-tert-butyl-1,1'-biphenyl-2,2'-diyl)phosphite, 2-ethylhexyl 3,3',5,5'-tetra-tert-butyl-1,1'-biphenyl-2,2'-diyl phosphite.

Mention should in particular be made here of: tris(2,4-di-tert-butylphenyl)phosphite; tris(nonylphenyl)phosphite; 6-fluoro-2,4,8,10-tetra-tert-butyl-12-methyldibenzo-[d,g]-1,3,2-dioxaphosphocin; 6-isooctyloxy-2,4,8,10-tetra-tert-butyl-12H-dibenzo[d,g]-1,3,2-dioxaphosphocin; bis(2,4-di-tert-butylphenyl)pentaerythritol diphosphite; bis(2,6-di-tert-butyl-4-methylphenyl)pentaerythritol diphosphite; bis(2,4-di-tert-butyl-6-methylphenyl)ethyl phosphite; bis(2,4-dicumylphenyl)pentaerythritol diphosphite; tetrakis(2,4-di-tert-butylphenyl) 4,4'-diphenylene diphosphonite; the triphosphite of the formula (XVII)

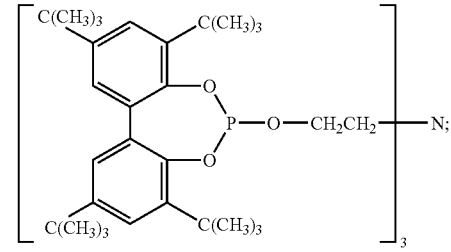

and the diphosphite of the formula (XVIII)

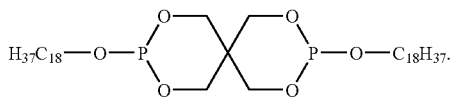
(XVIII)

Possible components (b) which should be emphasized here in particular are the organic phosphites and phosphonites: tris(nonylphenyl)phosphite; tris(2,4-di-tert-butylphenyl) phosphite; bis(2,4-di-tert-butyl-6-methylphenyl)ethyl phosphite; tetrakis(2,4-di-tert-butylphenyl) 4,4'-diphenylenediphosphonite; and bis(2,4-dicumylphenyl)pentaerythritol diphosphite.

The organic phosphites and phosphonites listed above for component (b) are compounds known per se, many of which are commercially available.

Sterically hindered phenols as possible component (c) of the stabilizer mixtures of the invention preferably comply with the formula (XIX)

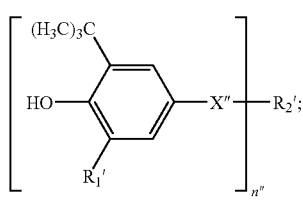
(XIX)

where
$R_1'$ is $C_1$-$C_4$-alkyl;
n" is 1, 2, 3, or 4;
X" is a methylene group; or a group of the formula (XX) or (XXI)

—CH$_2$—CH$_2$—C(=O)—Y"—; (XX)

—CH$_2$—C(=O)—O—CH$_2$—CH$_2$—; (XXI)

where Y" is an oxygen atom; or an —NH— group;
and where X"
  for n" equal to 1 is a group of the formula (XX) where Y" has bonding to $R_2'$ and $R_2'$ is $C_1$-$C_{25}$-alkyl;
  for n" equal to 2 is a group of the formula (XX), where Y" has bonding to $R_2'$ and $R_2'$ is a $C_2$-$C_{12}$-alkylene group; a $C_4$-$C_{12}$-alkylene group containing one or more oxygen or sulfur atoms; where if Y" is an —NH— group, $R_2'$ is a single chemical bond;
  for n" equal to 3 is a methylene group; a group of the formula (XXI), where the ethylene group has bonding to $R_2'$ and $R_2'$ is a group of the formula (XXII)

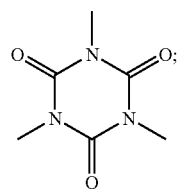
(XXII)

for n" equal to 4 is a group of the formula (XX), where Y" has bonding to $R_2$ and $R_2'$ is a $C_4$-$C_{10}$-alkanetetrayl group.

Examples of linear and branched $C_1$-$C_{25}$-alkyl groups are methyl, ethyl, propyl, isopropyl, butyl, isobutyl, sec-butyl, tert-butyl, 2-ethylbutyl, pentyl, 1-methylpentyl, isopentyl, neopentyl, tert-pentyl, hexyl, 1,3-dimethylbutyl, 2-methylpentyl, heptyl, isoheptyl, 1-methylhexyl, 1-ethylpentyl, octyl, 2-ethylhexyl, isooctyl, 1,1,3,3-tetramethylbutyl, 1-methylheptyl, 3-methylheptyl, nonyl, isononyl, 1,1,3,3-tetramethylpentyl, decyl, 1,1,3-trimethylhexyl, isodecyl, undecyl, dodecyl, 1-methylundecyl, 1,1,3,3,5,5-hexamethylhexyl, tridecyl, isotridecyl, tetradecyl, pentadecyl, hexadecyl, heptadecyl, octadecyl, nonadecyl, eicosyl and doeicosyl (the terms isooctyl, isononyl, isodecyl, and isotridecyl used above being trivial names which derive from the alcohols obtained by oxo synthesis cf. in this respect Ullmanns Encyklopädie der technischen Chemie, 4th edition, Volume 7, pp. 215-217, and also Volume 11, pp. 435 and 436);

$R_1'$ is preferably a methyl group or tert-butyl group.

For n" equal to 1, $R_2'$ is preferably a $C_1$-$C_{20}$-alkyl group, in particular a $C_4$-$C_{18}$-alkyl group. Particular definitions which should be emphasized for $R_2'$ are $C_9$-$C_{18}$-alkyl groups, and specifically here $C_{14}$-$C_{18}$-alkyl groups, e.g. octadecyl.

For n" equal to 2, $R_2'$ is usually a $C_2$-$C_{10}$-alkylene group, preferably a $C_2$-$C_8$-alkylene group. $R_2'$ is in particular a $C_4$-$C_8$-alkylene group, particularly preferably a $C_4$-$C_6$-alkylene group, e.g. hexamethylene. Where appropriate here, the alkylene groups may also contain one or more oxygen atoms or sulfur atoms.

Examples of linear or branched $C_2$-$C_{12}$-alkylene groups are ethylene, propylene, tetramethylene, pentamethylene, hexamethylene, heptamethylene, octamethylene, decamethylene, and dodecamethylene.

Examples of $C_4$-$C_{12}$-alkylene groups which contain one or more oxygen atoms or one or more sulfur atoms are —CH$_2$—O—CH$_2$CH$_2$—O—CH$_2$—, —CH$_2$—(O—CH$_2$CH$_2$)$_2$—O—CH$_2$—, —CH$_2$—(O—CH$_2$CH$_2$)$_3$—O—CH$_2$—, —CH$_2$—(O—CH$_2$CH$_2$)$_4$—O—CH$_2$—, and in particular —CH$_2$CH$_2$—O—CH$_2$CH$_2$—O—CH$_2$CH$_2$—, and —CH$_2$CH$_2$—S—CH$_2$CH$_2$—.

Examples of $C_4$-$C_{10}$-alkanetetrayl groups for $R_2'$, if n" is equal to 4, are

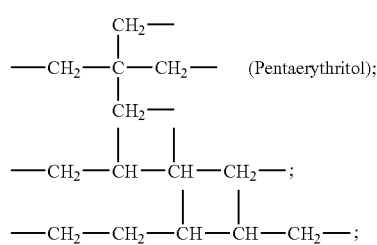

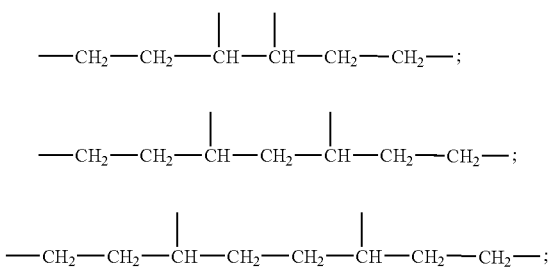

preferably the pentaerythritol radical.

In accordance with the abovementioned preferences, preferred sterically hindered phenols as possible component (c) are those where for n" equal to 1 in the formula (XIX) the radical $R_2'$ is a $C_1$-$C_{20}$-alkyl group.

In accordance with the abovementioned preferences, other preferred sterically hindered phenols as possible component (c) are those where for n" equal to 2 in the formula (XIX) the radical $R_2'$ is a $C_2$-$C_6$-alkylene group, a $C_4$-$C_8$-alkylene group which contains one or more oxygen atoms or one or more sulfur atoms, or, in the event that Y" is an —NH— group, a single chemical bond.

Other preferred sterically hindered phenols as possible component (c) are those where for n" equal to 4 in the formula (XIX) the radical $R_2'$ is one of the $C_4$-$C_6$-alkanetetrayl groups indicated above by way of example.

Other preferred sterically hindered phenols as possible component (c) in the stabilizer mixtures of the invention are those where in the formula (XIX) $R_1'$ is a methyl group or tert-butyl group, n" assumes a value of 1, 2, or 4, and X" is a group (XX), and Y" is an oxygen atom or an —NH— group, where for n" equal to 1, $R_2'$ is a $C_{14}$-$C_{18}$-alkyl group, n" equal to 2, $R_2'$ is a $C_4$-$C_6$-alkylene group, or a $C_4$-$C_6$-alkylene group containing one or more oxygen atoms or containing one or more sulfur atoms, and n" equal to 4, $R_2'$ is a $C_4$-$C_6$-alkanetetrayl group.

Sterically hindered phenols which are of interest as possible component (c) are those which have the formula (XIX) and which belong to the following listed group: N,N'-hexamethylene-bis[3-(3,5-di-tert-butyl-4-hydroxyphenyl)propionamide] (commercially available with the trademark Lowinox® HD-98; Great Lakes Chemical Corp.); octadecyl 3-(3',5'-di-tert-butyl-4'-hydroxyphenyl)propionate (commercially available with the trademark Anox™ PP18; Great Lakes Chemical Corp.); tetrakismethylene(3,5-di-tert-butyl-4-hydroxyhydrocinnamate)-methane (commercially available with the trademark Anox™ 20; Great Lakes Chemical Corp.); triethylene glycolbis[3-(3-tert-butyl-4-hydroxy-5-methylphenyl)propionate] (commercially available with the trademark Lowinox® GP-45; Great Lakes Chemical Corp.); 2,2'-thiodiethylene bis[3-(3,5-di-tert-butyl-4-hydroxyphenyl)propionate] (commercially available with the trademark Anox™ 70; Great Lakes Chemical Corp.); 1,3,5-tris(3,5-di-tert-butyl-4-hydroxybenzyl)isocyanurate (commercially available with the trademark Anox™ IC-14; Great Lakes Chemical Corp.); the compound of the formula

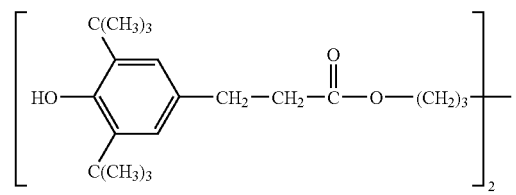

(commercially available with the trademark Irganox® 259; Ciba Specialty Chemicals); the compound of the formula

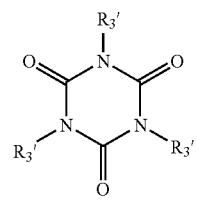

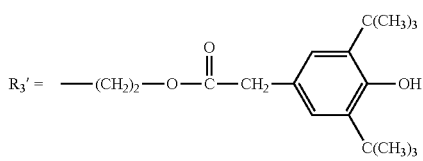

(commercially available with the trademark Irganox® 3125; Ciba Specialty Chemicals).

Other sterically hindered phenols preferred as possible component (c) in the stabilizer mixtures of the invention are those which contain a sterically hindered phenol group of the formula (I') or (I'a)

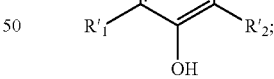

(I')

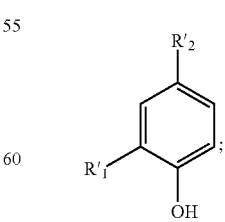

(I'a)

where $R'_1$ and $R'_2$, independently of one another, are as defined above.

Compounds of the formulae (II') and (II'a) are of particular interest here.

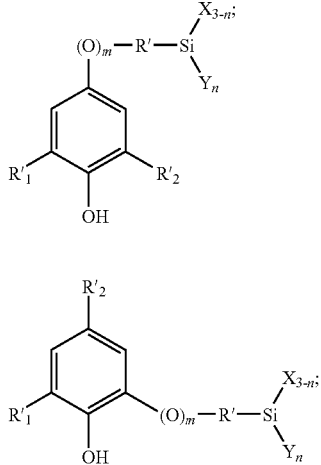

(II')

(II'a)

Compounds of the formulae (II') and (II'a) and compounds which contain groups of the formulae (I') and (I'a) are described in the specifications EP 162 523 A2 and EP 182 415 A2, which are expressly incorporated herein by way of reference. The compounds indicated above can give complex and highly viscous products of hydrolysis and/or condensation because the silyl radicals are hydrolyzable.

An example of the abovementioned compounds containing silyl groups is indicated below in the formula (II"):

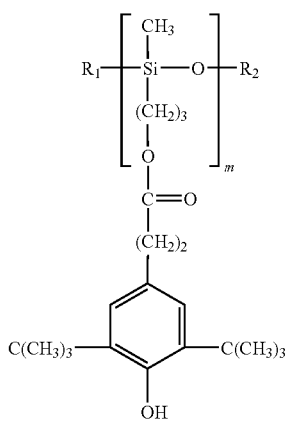

(II")

The "compound" is composed of a mixture, composed of linear oligomers where $R_1$ is hydroxy and $R_2$ is hydrogen, and of cyclic oligomers where each of $R_1$ and $R_2$ is a single chemical bond, with an average molar mass of 3 900 g/mol.

As mentioned above, the sterically hindered phenols as possible component (c) are known, and in some cases are also commercially available. Others among these compounds may moreover be prepared, for example, as described in the specifications U.S. Pat. No. 3,330,859, U.S. Pat. No. 3,960,928, EP 162 523 A2, and EP 182 415 A2.

Sterically hindered amines may also be present as further possible component (d) in the stabilizer compositions of the invention. At least one group of the formula (XXIII) or (XXIV)

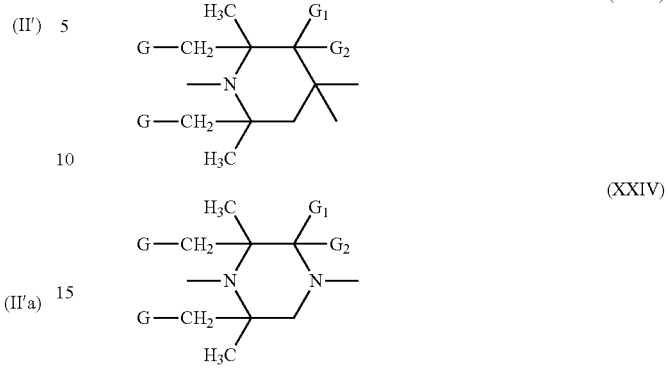

is present in these compounds, where
G is hydrogen; a methyl group;
$G_1$ and $G_2$, independently of one another, are hydrogen; a methyl group; or, together, an oxygen atom.

As possible component (d) in the stabilizer mixtures of the invention, use may be made of sterically hindered amines, preferably those selected from the groups (a') to (h') of compounds listed below, and which have at least one of the abovementioned groups of the formulae (XXIII) or (XXIV).

Group (a'): compounds of the formula (XXV):

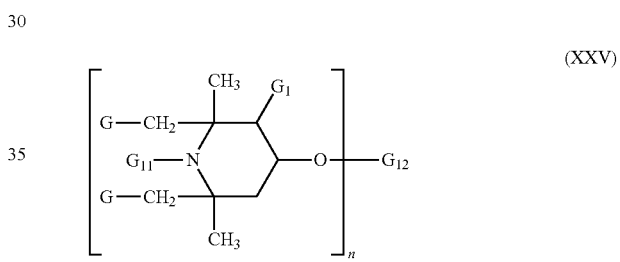

(XXV)

where
n is an integer from 1 to 4;
G and $G_1$, independently of one another, are hydrogen or a methyl group;
$G_{11}$ is hydrogen, oxygen (N-$G_{11}$ then forming a nitroxyl group), hydroxy, an NO group (nitroso group), a —$CH_2CN$ group, $C_1$-$C_{18}$-alkyl, $C_3$-$C_8$-alkenyl, $C_3$-$C_8$-alkynyl, $C_7$-$C_{12}$-arylalkyl, $C_1$-$C_{18}$-alkoxy, $C_5$-$C_8$-cycloalkoxy, $C_7$-$C_8$-phenylalkoxy, $C_1$-$C_8$-alkanoyl, $C_3$-$C_5$-alkenoyl, $C_1$-$C_{18}$-alkanoyloxy, benzyloxy, glycidyl; a —$CH_2CH$(OH)—Z group where Z is hydrogen, is methyl, or is phenyl; preferably hydrogen, $C_1$-$C_4$-alkyl, allyl, benzyl, acetyl or acryloyl;
$G_{12}$ for n equal to 1 is hydrogen, $C_1$-$C_{18}$-alkyl, containing no, or one, or more than one, oxygen atom, cyanoethyl, benzyl, glycidyl, a monovalent radical of an aliphatic, unsaturated or aromatic, cycloaliphatic, or arylaliphatic carboxylic acid, carbamic acid, or phosphorus-containing acid, or a monovalent silyl radical, preferably a radical of an aliphatic carboxylic acid having from 2 to 18 carbon atoms of a cycloaliphatic carboxylic acid having from 7 to 15 carbon atoms, of an α,β-unsaturated carboxylic acid having 3 to 5 carbon atoms, of an aromatic carboxylic acid having from 7 to 15 carbon atoms, where the aliphatic, cycloaliphatic, or aromatic moiety of these carboxylic acids has no substitution or has substitution with from one to 3 —$COOZ_{12}$ groups, and $Z_{12}$ is hydrogen, $C_1$-$C_{20}$-alkyl, $C_3$-$C_{12}$-alkenyl, $C_5$-$C_7$-cycloalkyl, phenyl, or benzyl;

for n equal to 2 is $C_2$-$C_{12}$-alkylene, $C_4$-$C_{12}$-alkenylene, a xylylene group, a divalent radical of an aliphatic, cycloaliphatic, arylaliphatic, or aromatic dicarboxylic acid, dicarbamic acid, or phosphorus-containing acid, or a divalent silyl radical, preferably a radical of an aliphatic dicarboxylic acid having from 2 to 36 carbon atoms, of a cycloaliphatic or aromatic dicarboxylic acid having from 8 to 14 carbon atoms, of an aliphatic, cycloaliphatic or aromatic dicarbamic acid having from 8 to 14 carbon atoms, or where the aliphatic, cycloaliphatic, or aromatic moiety of these carboxylic acids has no substitution or substitution with one or two —$COOZ_{12}$ groups, and $Z_{12}$ is as defined above;

for n equal to 3 is a trivalent radical of an aliphatic, cycloaliphatic, or aromatic tricarboxylic acid, where the aliphatic, cycloaliphatic, or aromatic moiety of this carboxylic acid has no substitution or has substitution with a —$COOZ_{12}$ group, and $Z_{12}$ is as defined above, or of an aromatic tricarbamic acid, or of a phosphorus-containing acid, or is a trivalent silyl radical; and for n equal to 4 is a tetravalent radical of an aliphatic, cycloaliphatic, or aromatic tetracarboxylic acid.

Examples of $C_1$-$C_{12}$-alkyl groups are: methyl, ethyl, n-propyl, n-butyl, sec-butyl, tert-butyl, n-hexyl, n-octyl, 2-ethylhexyl, n-nonyl, n-decyl, n-undecyl and n-dodecyl.

Examples of $C_1$-$C_{18}$-alkyl groups for $G_{11}$ and $G_{12}$, in addition to the abovementioned groups, are: n-tridecyl, n-tetradecyl, n-hexadecyl, and n-octadecyl.

Examples of $C_3$-$C_8$-alkenyl groups for $G_{11}$ are: 1-propenyl, allyl, methallyl, 2-butenyl, 2-pentenyl, 2-hexenyl, 2-octenyl, and 4-tert-butyl-2-butenyl.

Propargyl is preferably used as $C_3$-$C_8$-alkynyl group for $G_{11}$.

A particular group which may be used as $C_7$-$C_{12}$-arylalkyl group for $G_{11}$ is phenylethyl, or preferably benzyl.

Examples of $C_1$-$C_8$-alkanoyl groups for $G_{11}$ are: formyl, propionyl, butyryl, octanoyl, and in particular acetyl and, in the case of a $C_3$-$C_5$-alkanoyl group, preferably acryloyl.

Examples of monovalent carboxylic acid radicals for $G_{12}$ derive from acetic acid, caproic acid (hexanoic acid), stearic acid (octadecanoic acid), acrylic acid, methacrylic acid, benzoic acid, and β-(3,5-di-tert-butyl-4-hydroxyphenyl)propionic acid.

Examples of monovalent silyl radicals for $G_{12}$ are: a radical of the formula —$(C_jH_{2j})$—$Si(Z')_2Z''$, where j is an integer from 2 to 5 and Z' and Z", independently of one another, are a $C_1$-$C_4$-alkyl group or $C_1$-$C_4$-alkoxyl group.

Examples of bivalent dicarboxylic acid radicals for $G_{12}$ derive from malonic acid, succinic acid, glutaric acid, adipic acid, suberic acid (octanedioic acid), sebacic acid, maleic acid, itaconic acid (methylenesuccinic acid), phthalic acid, dibutylmalonic acid, dibenzylmalonic acid, butyl(3,5-di-tert-butyl-4-hydroxybenzyl)malonic acid, and bicycloheptenedicarboxylic acid.

Examples of trivalent tricarboxylic acid radicals for $G_{12}$ derive from trimellitic acid, citric acid, and nitrilotriacetic acid.

Examples of tetravalent tetracarboxylic acid radicals for $G_{12}$ derive from butane-1,2,3,4-tetracarboxylic acid and pyromellitic acid (1,2,4,5-benzenetetracarboxylic acid).

Examples of divalent dicarbamic acid radicals for $G_{12}$ derive from hexamethylenedicarbamic acid and 2,4-toluenedicarbamic acid.

Preference is given to compounds of the formula (XXV) where G is hydrogen, $G_{11}$ is hydrogen or methyl, $G_{12}$ is a diacyl radical of an aliphatic dicarboxylic acid having from 4 to 12 carbon atoms, and n is 2.

Particular examples of polyalkylpiperidines of the formula (XXV) are:

1) 4-hydroxy-2,2,6,6-tetramethylpiperidine;
2) 1-allyl-4-hydroxy-2,2,6,6-tetramethylpiperidine;
3) 1-benzyl-4-hydroxy-2,2,6,6-tetramethylpiperidine;
4) 1-(4-tert-butyl-2-butenyl)-4-hydroxy-2,2,6,6-tetramethylpiperidine;
5) 4-stearyloxy-2,2,6,6-tetramethylpiperidine;
6) 1-ethyl-4-salicyloyloxy-2,2,6,6-tetramethylpiperidine;
7) 4-methacryloyloxy-1,2,2,6,6-pentamethylpiperidine;
8) 1,2,2,6,6-pentamethylpiperidin-4-yl β-(3,5-di-tert-butyl-4-hydroxyphenyl)propionate;
9) bis(1-benzyl-2,2,6,6-tetramethylpiperidin-4-yl)maleate;
10) bis(2,2,6,6-tetramethylpiperidin-4-yl)succinate;
11) bis(2,2,6,6-tetramethylpiperidin-4-yl)glutarate; 12) bis(2,2,6,6-tetramethylpiperidin-4-yl)adipate;
13) bis(2,2,6,6-tetramethylpiperidin-4-yl)sebacate;
14) bis(1,2,2,6,6-pentamethylpiperidin-4-yl)sebacate;
15) bis(1,2,3,6-tetramethyl-2,6-diethylpiperidin-4-yl)sebacate;
16) bis(1-allyl-2,2,6,6-tetramethylpiperidin-4-yl)phthalate;
17) 1-hydroxy-4-β-cyanoethyloxy-2,2,6,6-tetramethylpiperidine;
18) 1-acetyl-2,2,6,6-tetramethylpiperidin-4-yl acetate;
19) tris(2,2,6,6-tetramethylpiperidin-4-yl)trimellitate;
20) 1-acryloyl-4-benzyloxy-2,2,6,6-tetramethylpiperidine;
21) bis(2,2,6,6-tetramethylpiperidin-4-yl)diethylmalonate;
22) bis(1,2,2,6,6-pentamethylpiperidin-4-yl)dibutylmalonate;
23) bis(1,2,2,6,6-pentamethylpiperidin-4-yl)n-butyl(3,5-di-tert-butyl-4-hydroxybenzyl)malonate;
24) bis(1-octyloxy-2,2,6,6-tetramethylpiperidin-4-yl)sebacate;
25) bis(1-cyclohexyloxy-2,2,6,6-tetramethylpiperidin-4-yl)sebacate;
26) hexane-1',6'-bis(4-carbamoyloxy-1-n-butyl-2,2,6,6-tetramethyl piperidine);
27) toluene-2',4'-bis(4-carbamoyloxy-1-n-propyl-2,2,6,6-tetramethylpiperidine);
28) dimethylbis(2,2,6,6-tetramethylpiperidin-4-oxy)silane;
29) phenyltris(2,2,6,6-tetramethylpiperidin-4-oxy)silane;
30) tris(1-propyl-2,2,6,6-tetramethylpiperidin-4-yl)phosphite;
31) tris(1-propyl-2,2,6,6-tetramethylpiperidin-4-yl)phosphate;
32) bis(1,2,2,6,6-pentamethylpiperidin-4-yl)phenylphosphonate;
33) 4-hydroxy-1,2,2,6,6-pentamethylpiperidine;
34) 4-hydroxy-N-hydroxyethyl-2,2,6,6-tetramethylpiperidine;
35) 4-hydroxy-N-(2-hydroxypropyl)-2,2,6,6-tetramethylpiperidine;
36) 1-glycidyl-4-hydroxy-2,2,6,6-tetramethylpiperidine;
37) 4-benzoyl-2,2,6,6-tetramethylpiperidine;
38) bis(1,2,2,6,6-pentamethylpiperidinyl)2-n-butyl-2-(2-hydroxy-3,5-di-tert-butylbenzyl)malonate;
39) bis(1-octyloxy-2,2,6,6-tetramethylpiperidinyl)succinate.

Group (b'): compounds of the formula (XXVI):

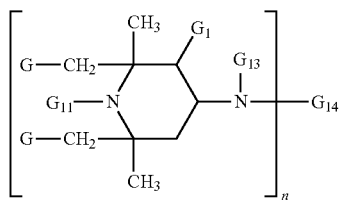

where
n is 1 or 2;
G, $G_1$, and $G_{11}$ are as defined under group (a');
$G_{13}$ is hydrogen, $C_1$-$C_{12}$-alkyl, $C_2$-$C_5$-hydroxyalkyl, $C_5$-$C_7$-cycloalkyl, $C_7$-$C_8$-arylalkyl, formyl, $C_2$-$C_{18}$-alkanoyl, $C_3$-$C_5$-alkenoyl, benzoyl, or a group of the formula

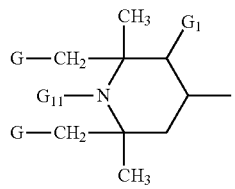

$G_{14}$ for n equal to 1 is hydrogen, $C_1$-$C_{15}$-alkyl, $C_3$-$C_8$-alkenyl, $C_5$-$C_7$-cycloalkyl, hydroxy-, cyano-, alkoxycarbonyl-, or carbamoyl-substituted $C_1$-$C_4$-alkyl, or glycidyl, or a group of the formula —$CH_2$—CH(OH)—Z or of the formula —CONH—Z, where Z is hydrogen, methyl, or phenyl, or, for the non-alkanoyl meanings of $G_{13}$, alkenoyl or benzoyl, or where $G_{13}$ and $G_{14}$ together form a divalent radical of an aliphatic, cycloaliphatic or aromatic 1,3-dicarboxylic acid;
for n equal to 2 is $C_2$-$C_{12}$-alkylene, $C_6$-$C_{12}$-arylene, a xylylene group, a group of the formula —$CH_2$—CH(OH)—$CH_2$—, or a group of the formula —$CH_2$—CH(OH)—$CH_2$—O-D-O, where D is $C_2$-$C_{10}$-alkylene, $C_{1\text{-}6}$—$C_{1\text{-}10}$-arylene, or $C_6$-$C_{12}$-cycloalkylene; a 1-oxo-($C_2$-$C_{12}$)-alkylene group, a divalent radical of an aliphatic, cycloaliphatic, or aromatic dicarboxylic or dicarbamic acid, or —CO—; or where $G_{13}$ and $G_{14}$ on the 4-nitrogen atom of the two piperidinyl radicals together form a radical of the formula

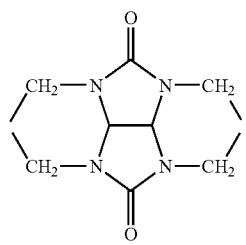

Possible $C_1$-$C_{12}$-alkyl or $C_1$-$C_{18}$-alkyl groups were described by way of example above in the group (a').
As $C_5$-$C_7$-cycloalkyl, use is preferably made of cyclohexyl.

As arylalkyl for $G_{13}$, use may be made of phenylethyl, preferably benzyl.

As $C_2$-$C_5$-hydroxyalkyl for $G_{13}$, use may be made of 2-hydroxyethyl and 2-hydroxypropyl, for example.

Examples of $C_2$-$C_{18}$-alkanoyl for $G_{13}$ are: propionyl, butyryl, octanoyl, dodecanoyl, hexadecanoyl, and octadecanoyl. Mention should in particular be made of acetyl, and acryloyl is preferred if $G_{13}$ is $C_3$-$C_5$-alkenoyl.

Examples of $C_2$-$C_8$-alkenyl for $G_{14}$ are: allyl, methallyl, 2-butenyl, 2-pentenyl, 2-hexenyl, and 2-octenyl.

Examples of hydroxy-, cyano-, alkoxycarbonyl-, or carbamoyl-substituted $C_1$-$C_4$-alkyl are: 2-hydroxyethyl, 2-hydroxypropyl, 2-cyanoethyl, methoxycarbonylmethyl, 2-ethoxycarbonylethyl, 2-aminocarbonylpropyl, and 2-(dimethylaminocarbonyl)ethyl.

Examples of $C_2$-$C_{12}$-alkylene are: ethylene, propylene, 2,2-dimethylpropylene, tetramethylene, hexamethylene, octamethylene, decamethylene, and dodecamethylene.

Examples of $C_6$-$C_{15}$-arylene are: o-, m-, or p-phenylene, 1,4-naphthylene, and 4,4'-diphenylene.

As $C_6$-$C_{12}$-cycloalkylene, use may in particular be made of cyclohexylene.

Preferred compounds of the formula (XXVI) are those where n is 1 or 2 and G is hydrogen, $G_{11}$ is hydrogen or methyl, $G_{13}$ is hydrogen, formyl, $C_1$-$C_{12}$-alkyl, or a group of the formula

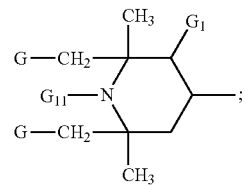

and
$G_{14}$ for n equal to 1 is hydrogen or $C_1$-$C_{12}$-alkyl, and
for n equal to 2 is $C_2$-$C_8$-alkylene, or a 1-oxo-($C_2$-$C_8$)-alkylene group.

Examples of polyalkylpiperidines of the formula (XXVI) are in particular:

1) N,N'-bis(2,2,6,6-tetramethylpiperidin-4-yl)hexamethylene-1,6-diamine;
2) N,N'-bis(2,2,6,6-tetramethylpiperidin-4-yl)hexamethylene-1,6-diacetamide;
3) bis(2,2,6,6-tetramethylpiperidin-4-yl)amine;
4) 4-benzoylamino-2,2,6,6-tetramethylpiperidine;
5) N,N'-bis(2,2,6,6-tetramethylpiperidin-4-yl)-N,N'-dibutyladipamide;
6) N,N'-bis(2,2,6,6-tetramethylpiperidin-4-yl)-N,N'-dicyclohexyl-2-hydroxypropylene-1,3-diamine;
7) N,N'-bis(2,2,6,6-tetramethylpiperidin-4-yl)-p-xylylenediamine
8) N,N'-bis(2,2,6,6-tetramethylpiperidin-4-yl)succinamide;
9) bis(2,2,6,6-tetramethylpiperidin-4-yl) N-(2,2,6,6-tetramethylpiperidin-4-yl)-β-aminodipropionate;

10) a compound of the formula:

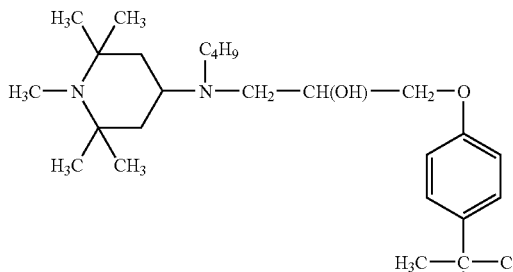

11) 4-[bis(2-hydroxyethyl)amino]-1,2,2,6,6-pentamethylpiperidine;
12) 4-(3-methyl-4-hydroxy-5-tert-butylbenzamido)-2,2,6,6-tetra-methylpiperidine;
13) 4-methacrylamido-1,2,2,6,6-pentamethylpiperidine;
14) N,N'-bisformylbis(2,2,6,6-tetramethylpiperidin-4-yl) hexamethylene-1,6-diamine (commercially available with the trademark Uvinul® 4050H; BASF Aktiengesellschaft);
15) N,N'-bisformylbis(1,2,2,6,6-pentamethylpiperidin-4-yl) hexamethylene-1,6-diamine;
16) a compound of the formula

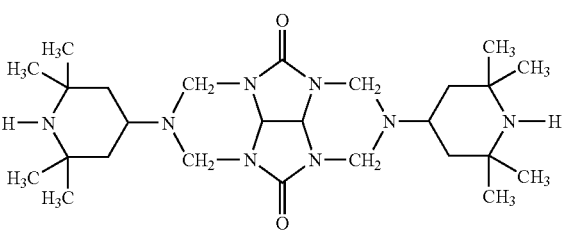 [SMILES: CC1(C)CC(N2CN3C(=O)N4CN(C5CC(C)(C)NC(C)(C)C5)CN5C(=O)N(C2)C3C45)CC(C)(C)N1]

(commercially available with the trademark Uvinul® 4049H; BASF Aktiengesellschaft);
17) a compound of the formula

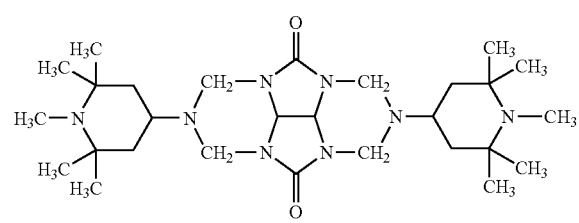

group (c'): compounds of the formula (XXVII):

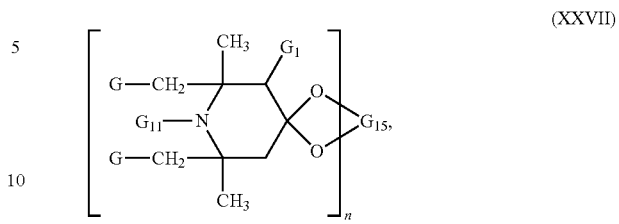

where
n is 1 or 2;
G, $G_1$, and $G_{11}$ are as defined under group (a');
$G_{15}$ for n equal to 1 is $C_2$-$C_8$-alkylene, $C_2$-$C_8$-hydroxyalkylene, or $C_4$-$C_{22}$-acyloxyalkylene, and
for n equal to 2 is a $(CH_2)_2C(CH_2—)_2$ group.
Examples of $C_2$-$C_8$-alkylene or $C_2$-$C_8$-hydroxyalkylene for $G_{15}$ are: ethylene, 1-methylethylene, propylene, 2-ethylpropylene, and 2-ethyl-2-hydroxymethylpropylene.
As an example of $C_4$-$C_{22}$-acyloxyalkylene for $G_{15}$, mention may be made of 2-ethyl-2-acetoxymethylpropylene.
Examples of polyalkylpiperidines of the formula (XXVII) are in particular:
1) 9-aza-8,8,10,10-tetramethyl-1,5-dioxaspiro[5.5]undecane;
2) 9-aza-8,8,10,10-tetramethyl-3-ethyl-1,5-dioxaspiro[5.5]undecane;
3) 8-aza-2,7,7,8,9,9-hexamethyl-1,4-dioxaspiro[4.5]decane;
4) 9-aza-3-hydroxymethyl-3-ethyl-8,8,9,10,10-pentamethyl-1,5-dioxaspiro[5.5]undecane;
5) 9-aza-3-ethyl-3-acetoxymethyl-9-acetyl-8,8,10,10-tetramethyl-1,5-dioxaspiro[5.5]undecane;
6) 2,2,6,6-tetramethylpiperidin-4-spiro-2'-(1',3'-dioxane)-5'-spiro-5"-(1",3"-dioxane)-2"-spiro-4'"-(2'",2'",6'",6'"-tetra-methylpiperidine).
Group (d'): compounds of the formulae (XXVIIIA), (XXVIIIB), and preferably (XXVIIIC):

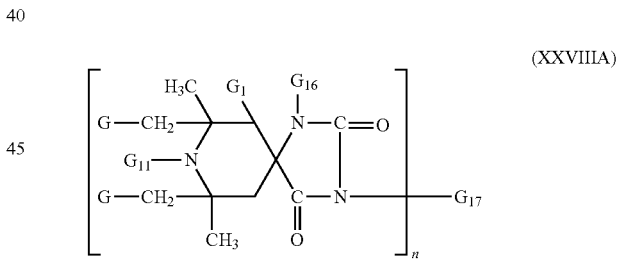

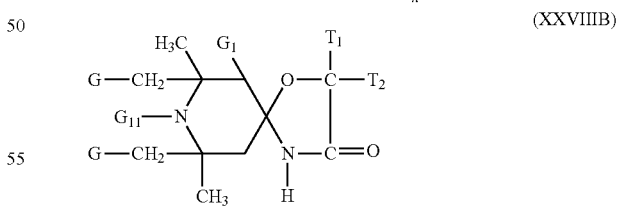

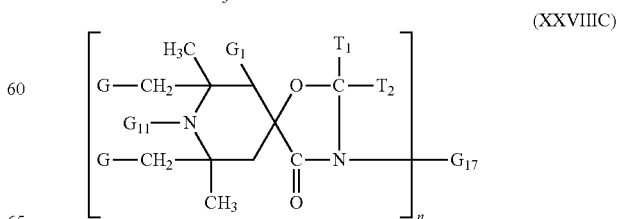

where
n is 1 or 2;

G, $G_1$, and $G_{11}$ are as defined under group (a');

$G_{16}$ is hydrogen, $C_1$-$C_{12}$-alkyl, allyl, benzyl, glycidyl, or $C_2$-$C_6$-alkoxyalkyl;

$G_{17}$ for n equal to 1 is hydrogen, $C_1$-$C_{12}$-alkyl, $C_3$-$C_5$-alkenyl, $C_7$-$C_9$-arylalkyl, $C_5$-$C_7$-cycloalkyl, $C_2$-$C_4$-hydroxyalkyl, $C_2$-$C_6$-alkoxyalkyl, $C_6$-$C_{10}$-aryl, glycidyl, or a group of the formula —$(CH_2)_p$—COO-Q or —$(CH_2)_p$—O—CO-Q, where p is 1 or 2 and Q is $C_1$-$C_4$-alkyl or phenyl, and for n equal to 2 is $C_2$-$C_{12}$-alkylene, $C_4$-$C_{12}$-alkenylene, $C_6$-$C_{12}$-arylene, or a group of the formula:
—$CH_2$—CH(OH)—$CH_2$—O-D-O—$CH_2$—CH(OH)—$CH_2$—, D being $C_2$-$C_{10}$-alkylene, $C_6$-$C_{15}$-arylene, or $C_6$-$C_{12}$-cycloalkylene, or is a group of the formula:
—$CH_2CH(OZ')CH_2$—$OCH_2$—CH(OZ')$CH_2$—$OCH_2$—CH(OZ')$CH_2$—, Z' being hydrogen, $C_1$-$C_{18}$-alkyl, allyl, benzyl, $C_2$-$C_{12}$-alkanoyl, or benzoyl;

$T_1$ and $T_2$, independently of one another, are hydrogen, unsubstituted or halogen- or $C_1$-$C_4$-alkyl-substituted $C_1$-$C_{16}$-alkyl, unsubstituted or halogen- or $C_1$-$C_4$-alkyl-substituted $C_6$-$C_{10}$-aryl, unsubstituted or halogen- or $C_1$-$C_4$-alkyl-substituted $C_7$-$C_9$-arylalkyl; or $T_1$ and $T_2$ together with the carbon atom to which they are bonded form a $C_5$-$C_{14}$ cycloalkane ring.

Examples of $C_1$-$C_{12}$-alkyl are: methyl, ethyl, n-propyl, n-butyl, sec-butyl, tert-butyl, n-hexyl, n-octyl, 2-ethylhexyl, n-nonyl, n-decyl, n-undecyl, and n-dodecyl.

Examples of $C_1$-$C_{19}$-alkyl supplementary to the $C_1$-$C_{12}$-alkyl radicals listed by way of example above are: n-tridecyl, n-tetradecyl, n-hexadecyl, and n-octadecyl.

Examples of $C_2$-$C_6$-alkoxyalkyl are: methoxymethyl, ethoxymethyl, propoxymethyl, tert-butoxymethyl, ethoxyethyl, ethoxypropyl, n-butoxyethyl, tert-butoxyethyl, isopropoxyethyl, and propoxypropyl.

Examples of $C_3$-$C_5$-alkenyl for $G_{17}$ are: 1-propenyl, allyl, methallyl, 2-butenyl, and 2-pentenyl.

Examples of $C_7$-$C_9$-arylalkyl for $G_{17}$, $T_1$, and $T_2$ are: phenylethyl, preferably benzyl.

Examples of the case where $T_1$ and $T_2$ together with the carbon atom to which they are bonded form cycloalkane rings are: cyclopentane, cyclohexane, cyclooctane, and cyclododecane.

Examples of $C_2$-$C_4$-hydroxyalkyl for $G_{17}$ are: 2-hydroxyethyl, 2-hydroxypropyl, 2-hydroxybutyl, and 4-hydroxybutyl.

Examples of $C_6$-$C_{10}$-aryl for $G_{17}$, $T_1$, and $T_2$ are: unsubstituted or halogen- or $C_1$-$C_4$-alkyl-substituted phenyl, and unsubstituted or halogen- or $C_1$-$C_4$-alkyl-substituted α- or β-naphthyl.

Examples of $C_2$-$C_{12}$-alkylene for $G_{17}$ are: ethylene, propylene, 2,2-dimethylpropylene, tetramethylene, hexamethylene, octamethylene, decamethylene, and dodecamethylene.

Examples of $C_4$-$C_{12}$-alkenylene for $G_{17}$ are: 2-butenylene, 2-pentenylene, and 3-hexenylene.

Examples of $C_6$-$C_{12}$-arylene for $G_{17}$ are: o-, m-, and p-phenylene, 1,4-naphthylene, and 4,4'-diphenylene.

Examples of $C_2$-$C_{12}$-alkanoyl for Z are: propionyl, butyryl, octanoyl, and dodecanoyl, preferably acetyl.

Examples of $C_2$-$C_{10}$-alkylene, $C_6$-$C_{15}$-arylene, and $C_6$-$C_{12}$-cycloalkylene for D are described under group (b').

Examples of polyalkylpiperidines of the formulae (XXVIIIA), (XXVIIIB), and (XXVIIIC) are in particular:

1) 3-benzyl-1,3,8-triaza-7,7,9,9-tetramethylspiro[4.5]decane-2,4-dione;

2) 3-n-octyl-1,3,8-triaza-7,7,9,9-tetramethylspiro[4.5]decane-2,4-dione;

3) 3-allyl-1,3,8-triaza-1,7,7,9,9-pentamethylspiro[4.5]decane-2,4-dione;

4) 3-glycidyl-1,3,8-triaza-7,7,8,9,9-pentamethylspiro[4.5]-decane-2,4-dione;

5) 1,3,7,7,8,9,9-heptamethyl-1,3,8-triazaspiro[4.5]decane-2,4-dione;

6) 2-isopropyl-7,7,9,9-tetramethyl-1-oxa-3,8-diaza-4-oxospiro-[4.5]decane;

7) 2-undecyl-7,7,9,9-tetramethyl-1-oxa-3,8-diaza-4-oxospiro-[4.5]decane;

8) 2,2-dibutyl-7,7,9,9-tetramethyl-1-oxa-3,8-diaza-4-oxospiro-[4.5]decane;

9) 2,2,4,4-tetramethyl-7-oxa-3,20-diaza-21-oxodispiro-[5.1.11.2]heneicosane;

10) 2-butyl-7,7,9,9-tetramethyl-1-oxa-4,8-diaza-3-oxospiro-[4.5]decane; and preferably 11) 8-acetyl-3-dodecyl-1,3,8-triaza-7,7,9,9-tetramethylspiro[4.5]decane-2,4-dione;

and compounds of the following formulae:

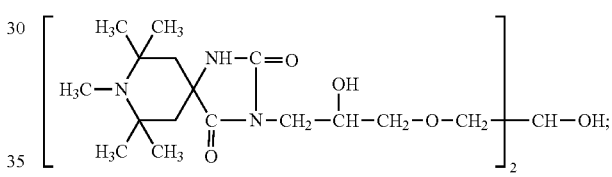

(XXVIII-11)

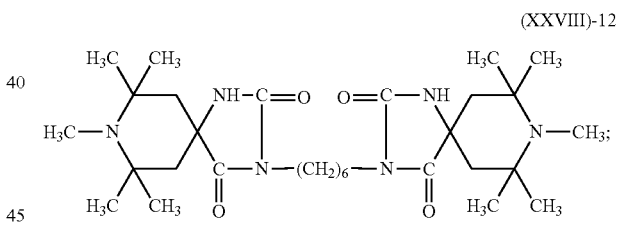

(XXVIII)-12

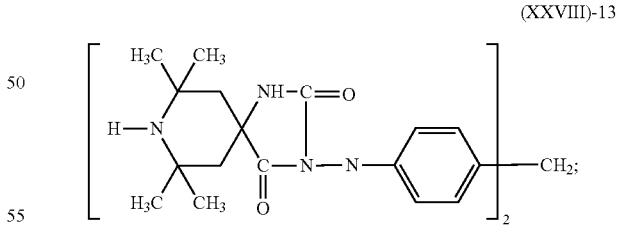

(XXVIII)-13

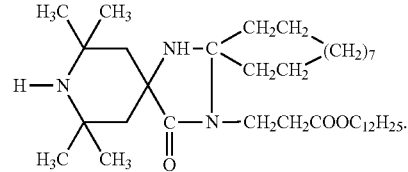

(XXVIII)-14

Group (e'): compounds of the formula (XXIX):

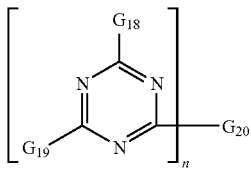
(XXIX)

where
n is 1 or 2;
$G_{18}$ is a group of the formula:

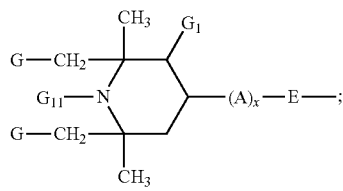

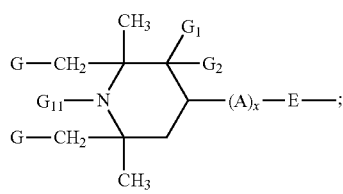

where G and $G_{11}$ are as defined under group (a');
$G_1$ and $G_2$, independently of one another, are hydrogen, or methyl, or together with the carbon atom to which they are bonded are a carbonyl group;
E is oxygen or an —$NG_{13}$— group;
A is $C_2$-$C_6$-alkylene or a —$(CH_2)_3$—O— group;
x is 0 or 1;
$G_{13}$ is hydrogen, $C_1$-$C_{12}$-alkyl, $C_2$-$C_5$-hydroxyalkyl, $C_5$-$C_7$-cycloalkyl;
$G_{19}$ is as defined for $G_{18}$ or is one of the following groups: —$NG_{21}G_{22}$, —$OG_{23}$, —$NHCH_2OG_{23}$, or —$N(CH_2OG_{23})_2$;
$G_{20}$ for n equal to 1 is as defined for $G_{18}$ or $G_{19}$,
for n equal to 2 is an -E-B-E- group, where B is a $C_2$-$C_8$-alkylene, uninterrupted or interrupted by one or two —$N(G_{21})$ groups;
$G_{21}$ is $C_1$-$C_{12}$-alkyl, cyclohexyl, benzyl, $C_1$-$C_4$-hydroxyalkyl, a group of the following formula:

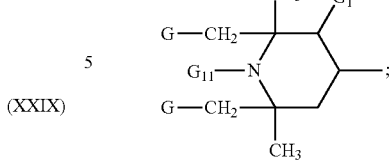

or a group of the following formula:

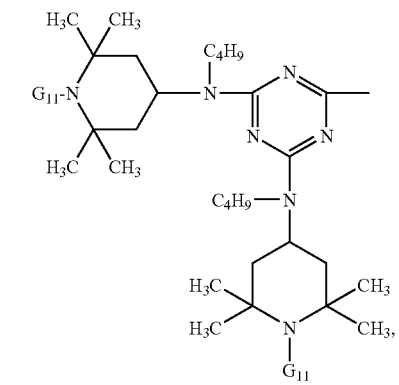

$G_{22}$ is $C_1$-$C_{12}$-alkyl, cyclohexyl, benzyl, $C_1$-$C_4$-hydroxyalkyl;
or $G_{21}$ and $G_{22}$ in the —$NG_{21}G_{22}$ group together form a $C_4$-$C_5$-alkylene group or a $C_4$-$C_5$-oxyalkylene group, or a group of the formula:

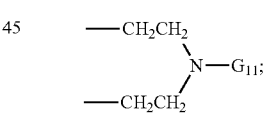

$G_{23}$ is hydrogen, $C_1$-$C_{12}$-alkyl, phenyl.

Examples of $C_1$-$C_{12}$-alkyl are: methyl, ethyl, n-propyl, n-butyl, sec-butyl, tert-butyl, n-hexyl, n-octyl, 2-ethylhexyl, n-nonyl, n-decyl, n-undecyl, and n-dodecyl.

Examples of $C_1$-$C_4$-hydroxyalkyl are: 2-hydroxyethyl, 2-hydroxypropyl, 3-hydroxypropyl, 2-hydroxybutyl, and 4-hydroxybutyl.

Examples of $C_2$-$C_6$-alkylene for A are: ethylene, propylene, 2,2-dimethylpropylene, tetramethylene, and hexamethylene.

If $G_{21}$ and $G_{22}$ together form $C_4$-$C_5$-alkylene or $C_4$-$C_5$-oxyalkylene, mention should be made of: tetramethylene, pentamethylene, and 3-oxapentamethylene.

Examples of polyalkylpiperidines of the formula (XXIX) are in particular:

(XXIX)-1
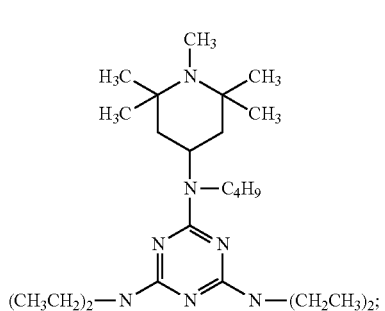
(XXIX)-2
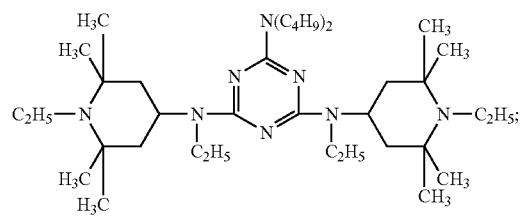
(XXIX)-3
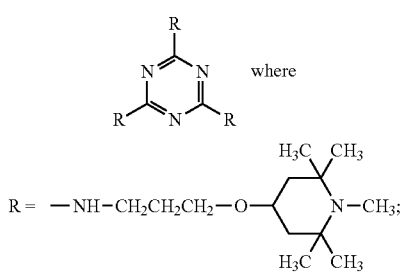
(XXIX)-4
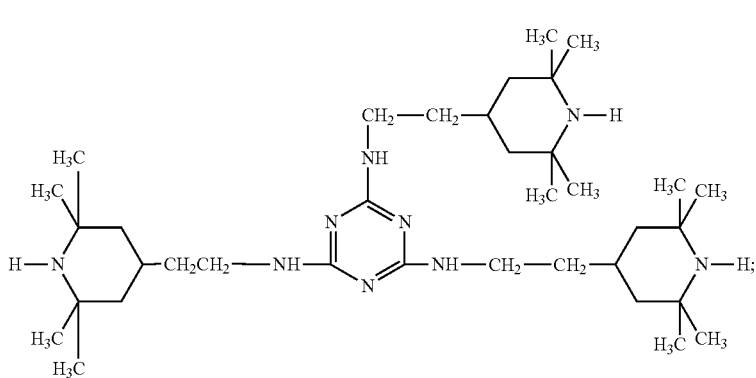
(XXIX)-5
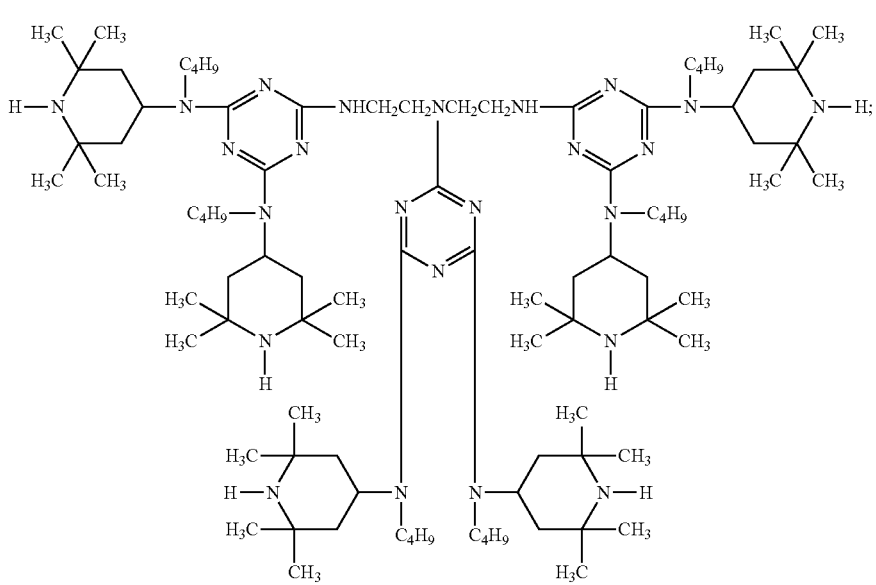

R—NH—(CH₂)₃—N(R)—(CH₂)₂—N(R)—(CH₂)₃—NH—R (XXIX)-6,
where R is
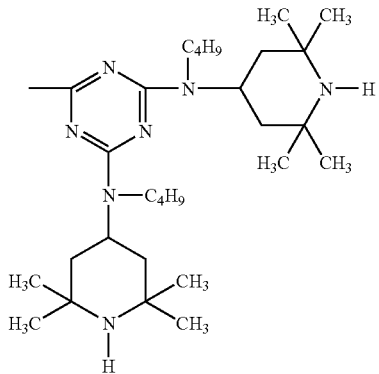
where R is
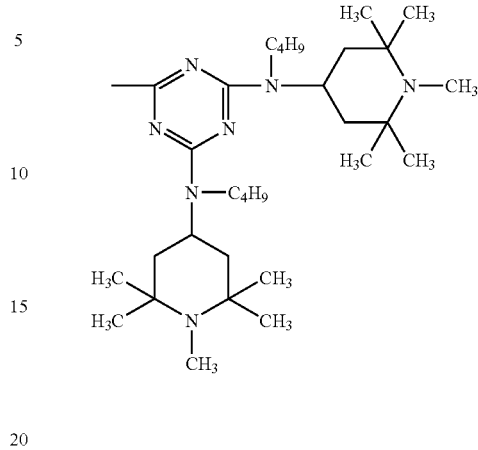
R—NH—(CH₂)₃—N(R)—(CH₂)₂—N(R)—(CH₂)₃—NH—R (XXIX)-7,
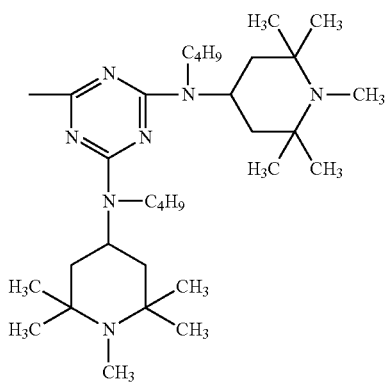
R—N(CH₃)—(CH₂)₃—N(R)—(CH₂)₂—N(R)—(CH₂)₃—N(CH₃)—R (XXIX)-8,
where R is
(XXIX)-9
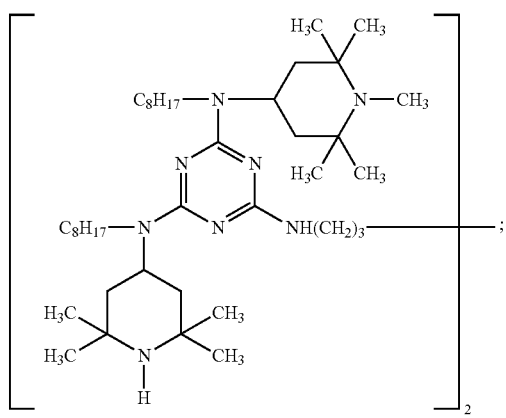
(XXIX)-10
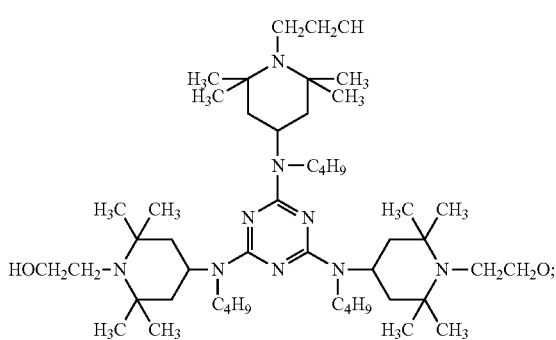

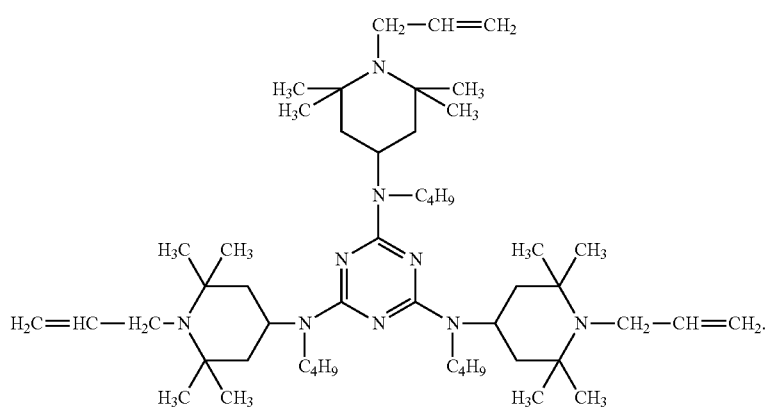
(XXIX)-11

Group (f'): oligomers or polymeric compounds whose repeat units contain 2,2,6,6-tetramethylpiperidine radicals, in particular polyesters, polyethers, polyamides, polyamines, polyurethanes, polyureas, polyaminotriazines, poly(meth)acrylates, and poly(meth)acrylamides, and also copolymers of these.

Examples of these 2,2,6,6-polyalkylpiperidines are determined by the following formulae, where m is a number from 2 to 200:

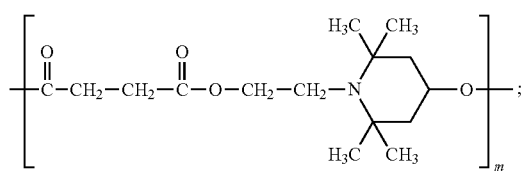
(XXX)-1

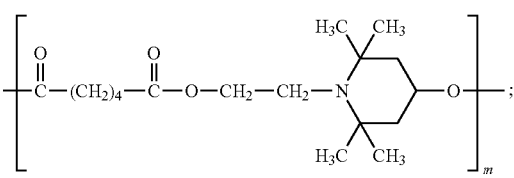
(XXX)-2

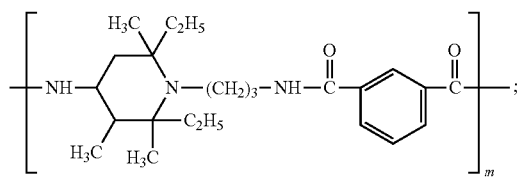
(XXX)-3

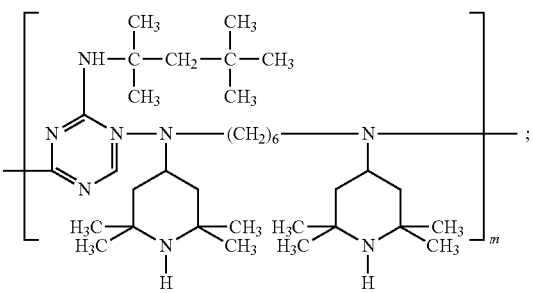
(XXX)-4

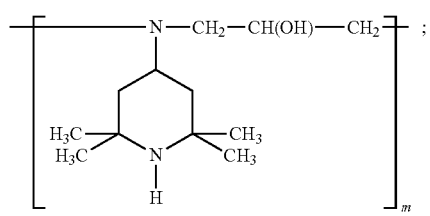
(XXX)-5

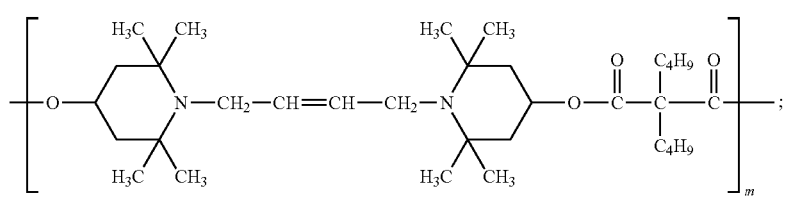
(XXX)-6

-continued
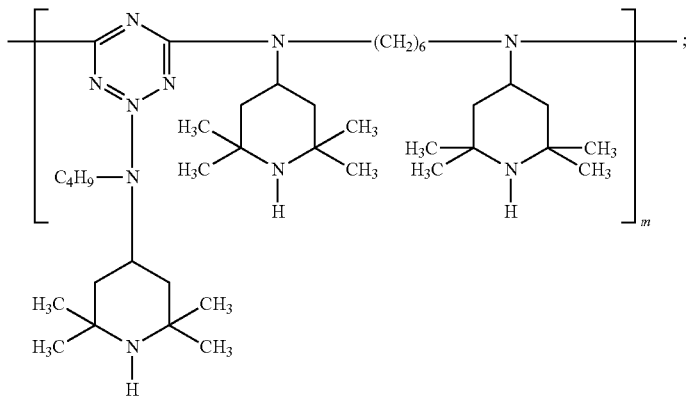
(XXX)-7
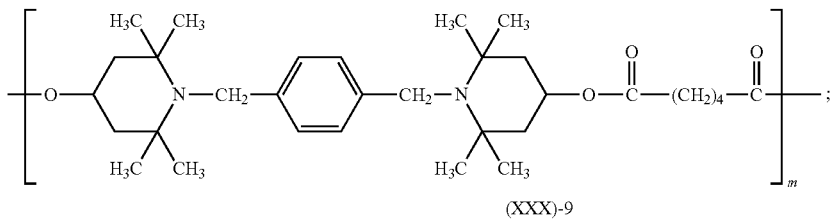
(XXX)-8
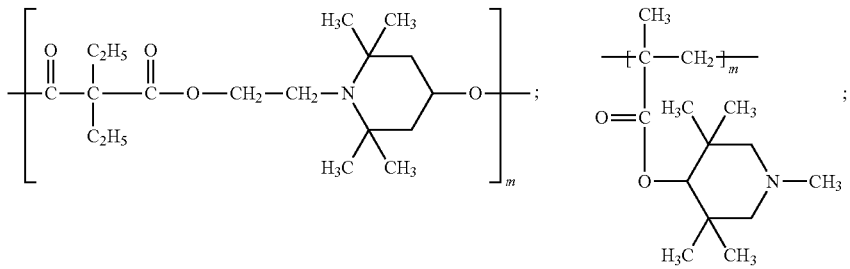
(XXX)-9
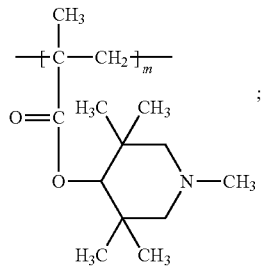
(XXX)-10
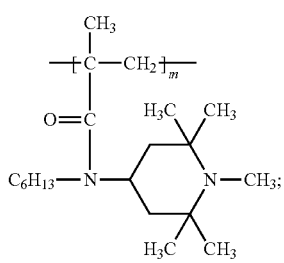
(XXX)-11
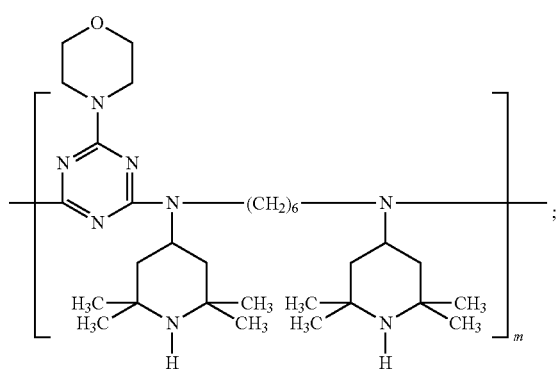
(XXX)-12
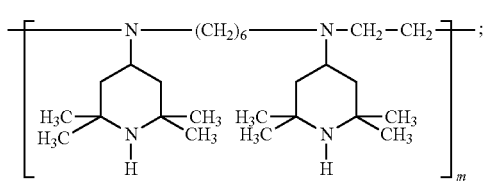
(XXX)-13
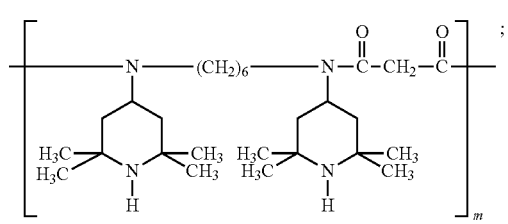
(XXX)-14
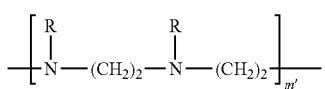

where R is a

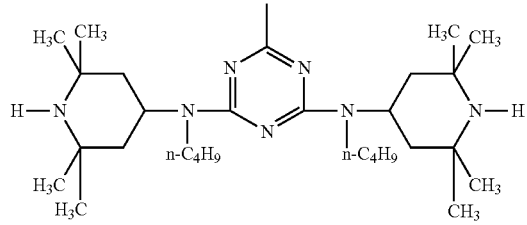

or

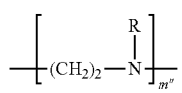

radical and each of m' and m" is a whole number from 0 to 200, with the proviso that m'+m"=m.

Other examples of polymeric compounds of the group (f') are:

the reaction products of compounds of the formula (XXXI)

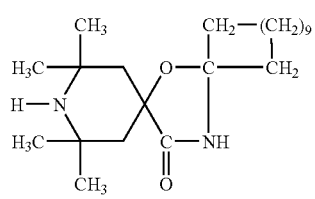

with epichlorohydrin;

polyesters which are obtained by reacting butane-1,2,3,4-tetracarboxylic acid with dihydric alcohols of the formula (XXXII):

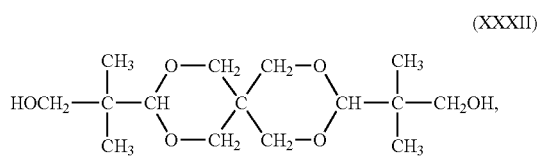

and whose terminal carboxy group derived from the tetracarboxylic acid has been esterified with 2,2,6,6-tetramethyl-4-hydroxypiperidine;

compounds of the formula (XXXIII):

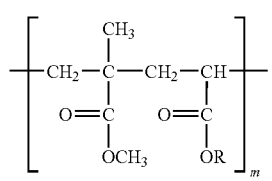

where about one third of the radicals R are ethyl and the remainder of the radicals R are a radical of the formula

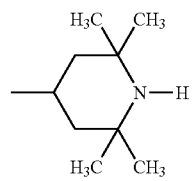

and m is a number from 2 to 200;

copolymers whose repeat units derive firstly from α-methylstyrene

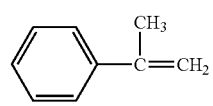

and secondly from maleimide derivatives of the formulae

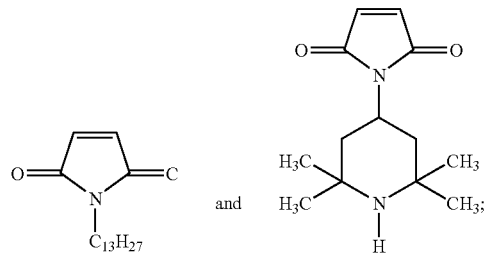

copolymers whose repeat units derive firstly from $C_{18}$-$C_{28}$ α-olefins or from mixtures of these olefins and secondly from maleimide derivatives of the formula

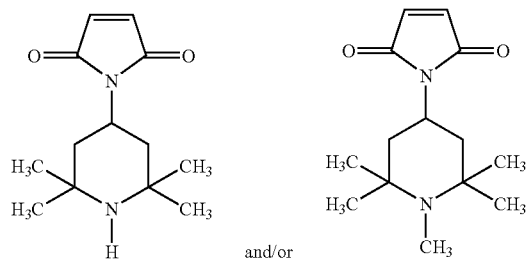

By way of example here, mention should be made of the commercially available product Uvinul® 5050H (hydrogen only on the 1-nitrogen of the piperidine ring; BASF Aktiengesellschaft).

Group (g'): compounds of the formula (XXXIV):

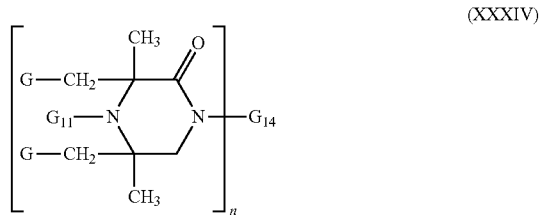

where
n is 1 or 2;
G and $G_{11}$ are as defined under group (a'), and
$G_{14}$ is as defined under group (b'), but neither a —CONH—Z group nor a —CH$_2$CH(OH)—CH$_2$—O-D-O group.

Examples of compounds of the formula (XXXIV) are:

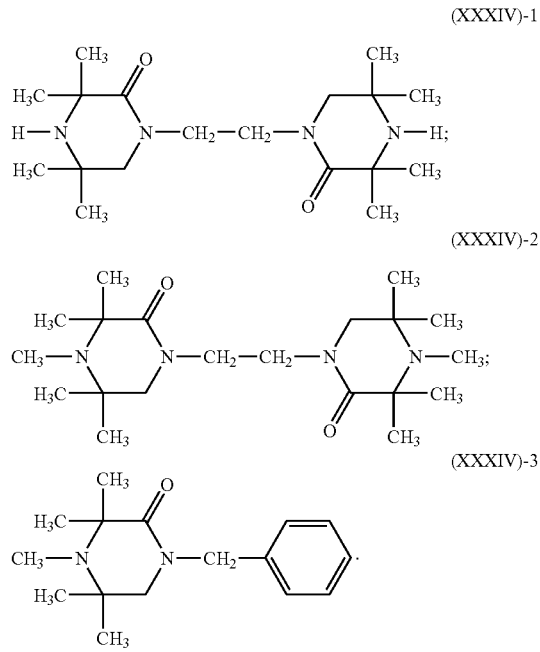

Group (h'): compounds of the formula (XXXV):

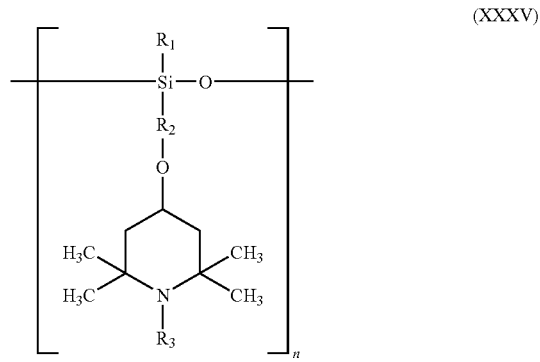

where:
$R_1$ is $C_1$-$C_{10}$-alkyl, unsubstituted or $C_1$-$C_4$-alkyl-substituted $C_5$-$C_{12}$-cycloalkyl, unsubstituted or $C_1$-$C_{10}$-alkyl-substituted phenyl;
$R_2$ is $C_3$-$C_{10}$-alkylene;
$R_3$ is hydrogen, $C_1$-$C_9$-alkyl, —O—, —CH$_2$CN, $C_3$-$C_6$-alkenyl, or is $C_7$-$C_9$-phenylalkyl, unsubstituted or with $C_1$-$C_4$-alkyl substitution of the phenyl radical, or is $C_1$-$C_9$-acyl, —OR'$_3$, with hydrogen or $C_1$-$C_{10}$-alkyl as R'$_3$, and
n is a number from 1 to 50.

Particularly important compounds for the purposes of the present invention are those which belong to the group (d) of the sterically hindered amines and have been selected from: Uvinul® 4049H (BASF Aktiengesellschaft); Uvinul® 4050H (BASF Aktiengesellschaft); Uvinul® 5050H (BASF Aktiengesellschaft); Tinuvin®123 (Ciba Specialty Chemicals); Tinuvin®144 (Ciba Specialty Chemicals); Lowilite® 76 (Great Lakes Chemical Corporation); Lowilite® 62 (Great Lakes Chemical Corporation); Lowilite® 94 (Great Lakes Chemical Corporation); Chimassorb® 119 (Ciba Specialty Chemicals); Cysorb® UV 3529 (Cytec); Cyasorb® UV 3346 (Cytec); the compound of the formula (XXXV)-1:

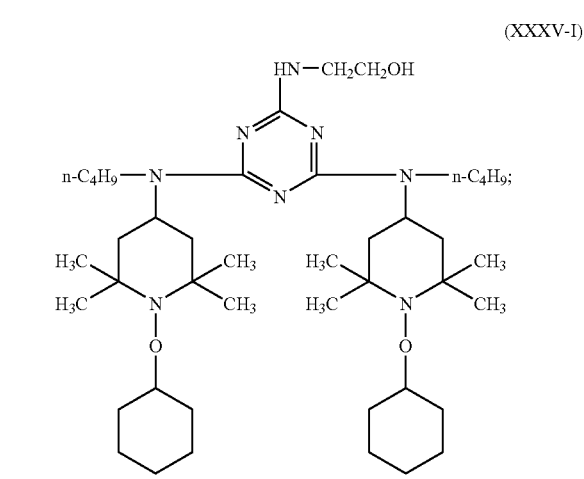

polymethylpropyl-3-oxy-[4-(2,2,6,6-tetramethyl)piperidinyl]-siloxane, commercially available with the trademark UVASIL® 299 (Great Lakes Chemical Corporation); polymethylpropyl-3-oxy-[4-(1,2,2,6,6-pentamethyl)piperidinyl] siloxane.

The compounds of the group (d) of the sterically hindered amines used according to the invention have an average molecular weight $M_n$ of from 500 to 10,000, in particular from 1,000 to 10,000.

As possible component (e), the stabilizer mixtures may comprise at least one compound selected from the group of the chromanes. These compounds preferably have the formula

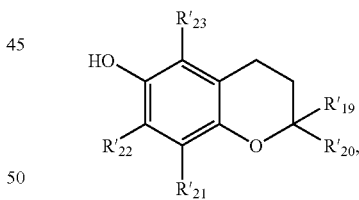

where
R'$_{19}$ is hydrogen; $C_1$-$C_{24}$-alkyl; $C_3$-$C_{12}$-cycloalkyl; mono- or polyunsaturated $C_2$-$C_{24}$-alkenyl; and
R'$_{20}$, R'$_{21}$, R'$_{22}$, and R'$_{23}$, independently of one another, are hydrogen; $C_1$-$C_{24}$-alkyl; $C_3$-$C_{12}$-cycloalkyl; mono- or polyunsaturated $C_2$-$C_{24}$-alkenyl; COOR'$_{19}$ carboxy groups; —CH(COOR'$_{19}$)—CH$_2$—COOR'$_{19}$ succinyl groups.

Possible $C_{1-24}$-alkyl, $C_{3-12}$-cycloalkyl, and $C_{1-24}$-alkenyl radicals have been listed at an earlier stage above by way of example. Mention may be made again here of the following:

For $C_1$-$C_{24}$-alkyl groups: methyl, ethyl, propyl, isopropyl, butyl, isobutyl, sec-butyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl and octadecyl (the above terms isooctyl, isononyl, isodecyl, and isotridecyl being trivial names deriving from the alcohols obtained by the oxo synthesis—cf. in this respect Ullmanns Encyklopädie der technischen Chemie, 4$^{th}$ edition, Volume 7, pp. 215 to 217, and also Volume 11, pp. 435 and 436);

For unsubstituted or substituted $C_3$-$C_{12}$-cycloalkyl groups, cycloheptyl, cyclooctyl, cyclohexyl, cyclopentyl, methylcyclohexyl, and its appropriate isomers;

For $C_2$-$C_{24}$-alkenyl groups: vinyl, 1- and 2-propenyl, 1-, 2-, and 3-butenyl, 1-, 2-, 3-, and 4-pentenyl, 1-, 2-, 3-, 4- and 5-hexenyl.

Particularly preferred compounds of component (e) are 2,5,7,8-tetramethyl-2-(4',8',12'-trimethyltridecyl)chroman-6-ol (α-tocopherol), 2,5,8-trimethyl-2-(4',8',12'-trimethyltridecyl)chroman-6-ol (β-tocopherol), 2,7,8-trimethyl-2-(4',8',12'-trimethyltridecyl)chroman-6-ol (γ-tocopherol), 2,8-dimethyl-2-(4',8',12'-trimethyltridecyl)chroman-6-ol (δ-tocopherol), 3,4-dihydro-2,2,5,7,8-pentamethyl-2H-1-benzopyran-6-ol, and 6-hydroxy-2,5,7,8-tetramethylchroman-2-carboxylic acid (Trolox).

As possible component (f), the stabilizer mixtures may comprise at least one organic or inorganic salt selected from the group consisting of zinc salts, calcium salts, magnesium salts, cerium salts, iron salts, and manganese salts.

In the case of the cerium salts, iron salts, and manganese salts, the oxidation state +2 is of importance for iron and manganese, the oxidation state +3 is of importance for cerium.

Preferred organic salts of zinc, calcium, magnesium, iron (II), and manganese(II) have the formula Me(An)$_2$, and preferred organic salts of cerium(III) have the formula Ce(An)$_3$, where Me is zinc, calcium, magnesium, iron(II), or manganese(II), and An is an anion of an organic acid or of an enol. The acid may be linear or branched, saturated or unsaturated, aliphatic, aromatic, araliphatic, or cycloaliphatic, and may be unsubstituted or else may have substitution by hydroxy groups or by alkoxyl groups. The acid preferably contains from 1 to 24 carbon atoms. Examples of these organic acids are sulfonic acids, sulfinic acids, phosphonic acids, and phosphinic acids, and preferably carboxylic acids.

Examples of carboxylic acids of this type are formic, acetic, propionic, butyric, isobutyric, caproic, 2-ethylcaproic, caprylic, capric, lauric, palmitic, stearic, behenic, oleic, lactic, ricinoleic, 2-ethoxypropionic, benzoic, salicylic, 4-butylbenzoic, 2-, 3-, or 4-toluic, 4-dodecylbenzoic, phenylacetic, naphthylacetic, cyclohexanecarboxylic, 4-butylcyclohexanecarboxylic, and cyclohexylacetic acid. The carboxylic acid may also be a technical mixture of carboxylic acids, for example of fatty acids or of alkylated benzoic acids.

Examples of organic acids which contain sulfur or contain phosphorus are methanesulfonic, ethanesulfonic, dodecanesulfonic, benzenesulfonic, toluenesulfonic, 4-nonylbenzenesulfonic, benzenesulfinic, and naphthalenesulfonic acid, dodecanesulfinic, benzenesulfinic, and naphthalenesulfinic acid, butylphosphonic acid, phenylphosphonic acid, and monoalkyl esters thereof, and diphenylphosphinic acid.

If An is an enol anion, it is preferably an anion of a β-dicarbonyl compound or of an o-acylphenol. Examples of β-dicarbonyl compounds are acetylacetone, benzoylacetone, dibenzoylmethane, methyl acetoacetate, ethyl acetoacetate, butyl acetoacetate, lauryl acetoacetate, and α-acetylcyclohexanone. Examples of o-acylphenols are 2-acetylphenol, 2-butyroylphenol, 2-acetylnaphthol, 2-benzoylphenol, and salicylaldehyde. The enolate is preferably the anion of a β-dicarbonyl compound having from 5 to 20 carbon atoms.

The anions present in organic salts of zinc, calcium, magnesium, iron(II), manganese(II), or of cerium(III) are preferably acetylacetonate or an aliphatic monocarboxylate having, for example, from 1 to 24 carbon atoms. Some of the particularly preferred salts are magnesium acetate, magnesium laurate, magnesium stearate, zinc formate, zinc acetate, zinc oenanthate, zinc laurate, zinc stearate, calcium acetate, calcium laurate, calcium stearate, manganese acetate, manganese laurate, manganese stearate, zinc acetylacetonate, calcium acetylacetonate, magnesium acetylacetonate, and manganese acetylacetonate.

Mention may be made of the following preferred inorganic salts of zinc, calcium, magnesium, iron(II), manganese(II), and cerium(III): their oxides, hydroxides, and carbonates, and also, in the case of magnesium, naturally occurring or synthetic dolomite or hydrotalcite. The inorganic salts are used in the form of fine powders with average particle sizes of a few μm.

The fine-particle polymer powders comprising at least one UV absorber, and the stabilizer mixtures of the invention, have excellent suitability for stabilizing polymers with respect to exposure to UV radiation and, respectively, with respect to exposure to UV radiation, oxygen and heat. Examples of polymers which may be stabilized by the polymer powders and, respectively, stabilizer mixtures are:

1. Polymers of monoolefins and of diolefins, e.g. polypropylene, polyisobutylene, poly-1-butene, poly-4-methyl-1-pentene, polyisoprene, or polybutadiene; and polymers of cycloolefins, e.g. polycyclopentene or polynorbonene; polyethylene (which may have been crosslinked if appropriate), e.g. HDPE, HMWHDPE, UMHWHDPE, MDPE, LDPE, LLDPE, BLDPE, VLDPE, and ULDPE.

The polyolefins, e.g. those based on the above-mentioned monoolefins, preferably polyethylene and polypropylene, may have been prepared by any of the processes known from the literature, in particular by the following processes:

(a) free-radical polymerization (generally carried out at high pressures and temperatures);

(b) catalytic polymerization, using catalysts which usually comprise one or more metals of groups IVB, VB, VIB, or VIII (IUPAC groups 4, 5, 6, or 8/9/10) of the Periodic Table. These metals generally have one or more ligands, e.g. oxides, halides, alcoholates, esters, ethers, amines, alkyl radicals, alkenyl radicals, and/or aryl radicals, and the coordination of the ligands here may be π-coordination or σ-coordination. The metal complexes themselves may be in free or supported form on substrates; examples which may be mentioned of catalysts are activated magnesium chloride, titanium(III) chloride, aluminum oxide, or silicon oxide. Said catalysts may be either soluble or else insoluble in the polymerization medium, and in the case of the supported form here they are naturally insoluble. The catalysts may be present alone or in the presence of other activators, e.g. alkyl metal compounds, metal hydrides, halides, or oxides of alkyl metal compounds or alkyl metal oxane compounds, the metals of these activators being within groups IA, IIA, and/or IIIA (IUPAC groups 1, 2 or 13) of the Periodic Table. Using a simple method, these activators may be modified with other ester groups, ether groups, amine groups, or silyl ether groups. These catalytic systems are usually termed Phillips, Standard-Oil-Indiana, Ziegler(Natta)-, TNZ- (DuPont), metallocene, or single-site" catalysts (SSCs).

2. Mixtures of polymers as described under item 1, e.g. mixtures of polypropylene with polyisobutylene; mixtures of polypropylene with polyethylene, such as PP/HDPE, PP/LDPE); mixtures of different types of polyethylene, e.g. LDPE/HDPE.

3. Copolymers of monoolefins and of diolefins with one another or with other monomers containing vinyl groups. Examples of these copolymers are ethylene-propylene copolymers, LLDPE and its mixtures with LDPE, propylen-1-butene copolymers, propylene-isobutylene copolymers, ethylene-1-butene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers, and copolymers of these with carbon monoxide. Other examples are ethylene-acrylic acid copolymers and salts of these (ionomers), and also terpolymers of ethylene with propylene and a diene, e.g. hexadiene, dicyclopentadiene, or ethylidenenorbornene; and mixtures of the copolymers mentioned with one another or with the polymers listed under item (1), e.g. polypropylene/ethylenepropylene copolymers, LDPE/ethylene-vinyl acetate (EVA) copolymers, LDPE/ethylene-acrylic acid (EAA) copolymers, LLDPE/EVA, LLDPE/EAA, and alternating or random polyalkylene-carbon monoxide copolymers, and mixtures of these with other polymers, e.g. with polyamides.

4. Polystyrene, poly(p-methylstyrene), poly(α-methylstyrene).

5. Copolymers of styrene or α-methylstyrene with dienes or with acrylic acid derivatives, e.g. styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; high-impact-strength mixtures involving styrene copolymers and involving other polymers, e.g. involving polyacrylates, involving diene polymers, or involving ethylene-propylene-diene terpolymers, or involving block copolymers of styrene, e.g. styrene-butadiene-styrene, styrene-isoprene-styrene, styrene-ethylene-butylene-styrene, or styrene-ethylene-propylene-styrene.

6. Graft copolymers of styrene or α-methylstyrene, e.g. styrene in polybutadiene, styrene in polybutadiene-styrene copolymers or in polybutadiene-acrylonitrile copolymers; styrene and acrylonitrile (or methacrylonitrile) in polybutadiene; styrene, acrylonitrile, and methyl methacrylate in polybutadien; styrene and maleic anhydride in polybutadiene; styrene, acrylonitrile, and maleic anhydride or maleimide in polybutadiene; styrene and maleimide in polybutadiene; styrene and alkyl acrylates or alkyl methacrylates in polybutadiene; styrene and acrylonitrile in ethylenepropylene-diene terpolymers, styrene and acrylonitrile in polyalkyl acrylates or in polyalkyl methacrylates, styrene and acrylonitrile in acrylate-butadiene copolymers, and also mixtures of copolymers listed under item (5), e.g. mixtures of known copolymers, for example ABS, MBS, ASA, or AES.

7. Halogen-containing polymers, e.g. polychloroprene, chlorinated elastomers, chlorinated or brominated isobutylene-isoprene copolymers (halobutyl rubber), chlorinated or chlorosulfonated polyethylene, chlorinated ethylene copolymers, homopolymers and copolymers of epichlorohydrin, and in particular polymers of halogen-containing vinyl compounds, for example polyvinyl chloride, polyvinylidene chloride, polyvinyl fluoride, or polyvinylidene fluoride; and also their copolymers, for example those based on vinyl chloride-vinylidene chloride, vinyl chloride-vinyl acetate or vinylidene chloride-vinyl acetate.

8. Polymers derived from 4-unsaturated acids and from their derivatives, e.g. polyacrylates and polymethacrylates, polymethyl methacrylates, polyacrylamides, and polyacrylonitriles, impact-modified with butyl acrylate.

9. Copolymers based on monomers of item (8) with one another or with other unsaturated monomers, e.g acrylonitrile-butadiene copolymers, acrylonitril-alkyl acrylate copolymers, acrylonitrile-alkoxyalkyl acrylate copolymers, or acrylonitrile-vinyl halide copolymers or acrylonitrile-alkyl methacrylate-butadiene terpolymers.

10. Polymers derived from unsaturated alcohols and amines or from their acyl or acetal derivatives, e.g. polyvinyl alcohol, polyvinyl acetate, polyvinyl stearate, polyvinyl benzoate, polyvinyl maleate, polyvinyl butyral, polyallyl phthalate, or polyallylmelamine; and their copolymers with olefins listed under item (1).

11. Homopolymers and copolymers of open-chain or cyclic ethers, e.g. polyalkylene glycols, polyethylene oxide, polypropylene oxide, or copolymers of the abovementioned compounds with bisglycidyl ethers.

12. Polyacetals, e.g. polyoxymethylene and polyoxymethylene containing comonomers, such as ethylene oxide; polyacetals modified using thermoplastic polyurethanes, using acrylates, or using MBS.

13. Polyphenylene oxides and polyphenylene sulfides and mixtures of either of these with styrene polymers or with polyamides.

14. Polyurethanes derived firstly from hydroxy-terminated polyethers, polyesters, or polybutadienes, and secondly from aliphatic or aromatic polyisocyanates, or derived from the precursors of each of these.

15. Polyamides and copolyamides derived from diamines and from dicarboxylic acids, and/or aminocarboxylic acids, or from corresponding lactams, e.g. nylon-4, nylon-6, nylon-6,6, 6,10, 6,9, 6,12, 4,6, 12,12, or nylon-11 or nylon-12, aromatic polyamides based on m-xylenediamine and adipic acid; polyamides based on hexamethylenediamine and isophthalic and/or terephthalic acid, with or without an elastomer as modifier, e.g. poly-2,4,4-trimethylhexamethylene-terephthalamide or poly-m-phenyleneisophthalamide; and also block copolymers of the above polyamides with polyolefins, with olefinic copolymers, with ionomers, or with elastomers, chemically bonded or grafted, or with polyethers, e.g. polyethylene glycol, polypropylene glycol or polytetra-methylene glycol; and also polyamides or copolyamides modified using EPDM or ABS and polyamides condensed during processing ("RIM polyamide systems").

16. Polyureas, polyimides, polyamideimides, polyetherimides, polyesterimides, polyhydantoins, and polybenzoimidazoles.

17. Polyesters derived from dicarboxylic acids and from diols, and/or from hydroxycarboxylic acids or from the corresponding lactones, e.g. polyethylene terephthalate, polybutylene terephthalate, poly-1,4-dimethylolcyclohexane terephthalate, and polyhydroxybenzoates, and also block copolyetheresters derived from polyethers using hydroxy-terminated groups, and also polyesters modified using polycarbonates or using MBS.

18. Polycarbonates and polyester carbonates.

19. Polysulfones, polyether sulfones, and polyether ketones.

20. Crosslinked polymers derived firstly from aldehydes and secondly from phenols, from urea, or from melamines, e.g. phenol-formaldehyde resins, urea-formaldehyde resins, and melamine-formaldehyde resins.

21. Drying and non-drying alkyd resins.
22. Resins based on unsaturated polyesters, where these derive from copolyesters of saturated and unsaturated carboxylic acids with polyhydric alcohols and vinyl compounds as crosslinking agents, and also the above-mentioned halogen-containing flame-retardant resins.
23. Crosslinkable acrylic resins derived from substituted acrylates, e.g. epoxy-derived acrylates, urethane-derivated acrylates, or polyester-derived acrylates.
24. Alkyd resins, resins based on polyesters, or acrylated, melamine-crosslinked resins, resins based on urea, resins based on isocyanates, resins based on isocyanurates, resins based on polyisocyanates, or epoxy resins.
25. Crosslinked epoxy resins derived from aliphatic, cycloaliphatic, heterocyclic, or aromatic glycidyl compounds, e.g. products from diglycidyl ethers of bisphenol A and bisphenol F, crosslinked using conventional crosslinking agents, e.g. using anhydrides or amines, in the presence or absence of accelerators.
26. Naturally occurring polymers, such as cellulose, rubber, gelatin, and their derivatives chemically modified to obtain homologous polymers, e.g. cellulose acetates, cellulose propionates, cellulose butyrates, or cellulose ethers, e.g. methylcellulose; and also hydrocarbon resins (rosins) and their derivatives.
27. Mixtures of the polymers mentioned (polyblends) e.g. PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PU, PC/thermoplastic PU, POM/acrylates, POM/MBS, PPO/HIPS, PPO/PA 6.6, and copolymers, PA/HDPE, PAPP, PAPPO, PBT/PC/ABS, PBT/PET/PC.
28. Naturally occurring or synthetic organic materials which are pure monomeric compounds, and also mixtures of these, e.g. mineral oils, animal or vegetable oils, fats or waxes, oils, fats, or waxes based on synthetic esters, e.g. phthalates, adipates, phosphates, and trimellitates, and also mixtures of synthetic esters with mineral oils in any desired ratio by weight, and also aqueous emulsions of the organic materials mentioned.
29. Aqueous emulsions of naturally occurring or synthetic rubber, e.g. natural latex or latices based on carboxylated styrene-butadiene copolymers.

The fine-particle polymer powders comprising at least one UV absorber, or the stabilizer mixtures of the invention, may also be used in the preparation of polyurethanes, in particular in the preparation of polyurethane foams. The result is that the resultant polyurethanes and polyurethane foams are stabilized with respect to exposure to UV radiation or, respectively, with respect to exposure to UV radiation, oxygen and heat.

One way of obtaining the polyurethanes is by reaction of polyethers, polyesters, and polybutadienes which contain terminal hydroxy groups with aliphatic or aromatic polyisocyanates.

Polyethers having terminal hydroxy groups are well-known and may be prepared, for example, by polymerizing epoxides, e.g. ethylene oxide, propylene oxide, butylene oxide, styrene oxide, or epichlorohydrin, for example in the presence of boron trifluoride, or via an addition reaction of the epoxides, alone or in mixture with one another, or in a successive reaction using starters which contain reactive hydrogen atoms, e.g. water, alcohols, ammonia, or amines, for example ethylene glycol, propylene 1,2- or 1,3-glycol, trimethylolpropane, 4,4'-dihydroxy-diphenylpropane, aniline, ethanolamine, or ethylenediamine. It is also possible to use polyethers which contain sucrose. In most cases preference is given to polyethers having a large number of primary OH groups (up to 90% of all of the OH groups present in the polyether). Use may also be made of polyethers modified using vinyl polymers, one method of preparing these polyethers being polymerization of styrene and acrylonitrile in the presence of polyethers which are polybutadienes having OH groups.

The abovementioned compounds are polyhydroxy compounds and have molar masses in the range from 400 to 10,000 g/mol, in particular from 800 to 10,000 g/mol, preferably from 1,000 to 6,000 g/mol, the polyethers thus having, for example, at least two, usually from 2 to 8, but preferably from 2 to 4, hydroxy groups, and being thus known for the preparation of homogeneous polyurethanes and of cellular polyurethanes.

It is, of course, also possible to use mixtures of the abovementioned compounds which have at least two hydrogen atoms reactive toward isocyanate groups and preferably have a molar mass of from 400 to 10,000 g/mol.

Suitable compounds are aliphatic, cycloaliphatic, araliphatic, aromatic, or heterocyclic polyisocyanates, e.g. ethylene diisocyanate, tetramethylene-1,4-diisocyanate, hexamethylene 1,6-diisocyanate, dodecane 1,12-diisocyanate, cyclobutane 1,3-diisocyanate, cyclohexane 1,3- or -1,4-diisocyanate, and also mixtures of these isomers; 1-isocyanato-3,3,5-trimethyl-5-iso-cyanatomethylcyclohexane, hexahydrotolylene 2,4- and 2,6-diisocyanate and also mixtures of these isomers; hexahydrophenylene 1,3- and/or 1,4-diisocyanate, perhydrodiphenylmethane 2,4'- and/or 4,4'-diisocyanate, phenylene 1,3- and 1,4-diisocyanate, tolylene 2,4- and 2,6-diisocyanate, and also mixtures of these isomers; diphenylmethane 2,4'- and/or -4,4'-diisocyanate, naphthylene 1,5-diisocyanate, triphenylmethane 4,4',4"-triisocyanate, polyphenyl polymethylene polyisocyanates, obtained by aniline/formaldehyde condensation followed by phosgenation, m- and p-isocyanatophenylsulfonyl isocyanates, perchlorinated arylpolyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, the reaction products of the abovementioned isocyanates with acetals, and also polyisocyanates which contain residues of polymeric fatty acids.

It is also possible to use distillation residues which contain isocyanate groups, these residues arising during industrial production of isocyanates and being in undiluted form or dissolved in one or more of the abovementioned polyisocyanates. It is also possible to use any desired mixture of the abovementioned polyisocyanates.

It is preferable to use polyisocyanates which are easily obtainable industrially, examples of these being tolylene 2,4- and 2,6-diisocyanate, and also any desired mixture of these isomers ("TDI"); polyphenyl polymethylene polyisocyanates obtained by aniline/formaldehyde condensation followed by phosgenation ("crude MDI"); polyisocyanates containing carbodiimide groups, containing urethane groups, containing allophanate groups, containing isocyanurate groups, containing urea groups, and/or containing biuret groups (known as modified polyurethanes).

For the purposes of the present invention, paints, and the binders present in them, are among the polymers which can be stabilized by the polymer powders comprising UV absorbers, or by the stabilizer mixtures of the invention. These binders are usually composed of, or comprise, one or more of the polymers described under the abovementioned points 1 to 29, in particular of one or more polymers described under points 20 to 25.

The polymers which may be stabilized by the polymer powders comprising UV absorbers or by the stabilizer mixtures of the invention are preferably those naturally occurring, semi-synthetic or synthetic polymers selected from the groups described above. The polymer powders comprising UV absorbers, or the stabilizer mixtures of the invention, are particularly used in the stabilization of thermoplastic polymers, preferably of polyolefins, particularly preferably of polyethylene and polypropylene, or their copolymers with mono- or diolefins.

Irrespective of whether the preferred embodiment is used, the present invention therefore also provides polymers, in particular polyolefins, stabilized with respect to exposure to UV radiation and comprising at least one UV absorber.

Irrespective of whether the preferred embodiment is used, the present invention also provides polyemrs, in particular polyolefins, stabilized with respect to exposure to UV radiation, oxygen and heat and comprising an effective amount of stabilizer mixtures of the invention.

The present invention also provides articles produced from the abovementioned inventive polymers, in particular polyolefins, stabilized with respect to exposure to UV radiation and, respectively, stabilized with respect to exposure to UV radiation, oxygen and heat.

Component (a) and the at least one other component selected from the group consisting of components (b) to (f) of the stabilizer mixtures of the invention may be either separate or else have been mixed with one another when added to the polymers.

The amount of component (a) added to the polymers to be stabilized is from 0.0005 to 5% by weight, preferably from 0.001 to 2% by weight, and in particular from 0.01 to 2% by weight, based on the weight of the polymers to be stabilized.

The amount of each of the components (b) and/or (c) and/or (d), and/or (e), and/or (f) added to the polymers to be stabilized is from 0.01 to 10% by weight, preferably from 0.01 to 5% by weight, particularly preferably from 0.025 to 3% by weight, and in particular from 0.025 to 1% by weight, based on the weight of the materials to be stabilized.

If components (a) and (b), and also, where appropriate, (c) and/or (d), and/or (e), and/or (f) of the stabilizer mixtures of the invention are added in the form of a mixture to the materials to be stabilized, their amounts present in the stabilizer mixtures of the invention are the amounts described above (based on the weight of the materials to be stabilized).

Preferred stabilizer mixtures comprise, besides components (a) and (b), at least one compound selected from the group consisting of sterically hindered phenols as component (c) and also, where appropriate, other compounds selected from the group of components (d), (e), and (f).

Other preferred stabilizer mixtures comprise, besides components (a) and (b), at least one compound selected from the group consisting of sterically hindered amines as component (d) and also, where appropriate, other compounds selected from the group of components (c), (e), and (f).

Other preferred stabilizer mixtures comprise, besides components (a) and (b), at least one compound selected from the group of the chromanes as component (e), and also, where appropriate, other compounds selected from the group of components (c), (d), and (f).

Other preferred stabilizer mixtures comprise, besides components (a) and (b), at least one organic or inorganic salt selected from the group consisting of zinc salts, calcium salts, magnesium salts, cerium salts, iron salts, and manganese salts, as component (f), and also, where appropriate, other compounds selected from the group of components (c), (d), and (e).

Preferred stabilizer mixtures comprise, besides components (a) and (b), at least one compound selected from the group consisting of sterically hindered phenols as component (c), and at least one compound selected from the group consisting of sterically hindered amines as component (d), and also, where appropriate, other compounds selected from the group of components (e) and (f).

Other preferred stabilizer mixtures comprise, besides components (a) and (b), at least one compound selected from the group consisting of sterically hindered phenols as component (c), and at least one compound selected from the group of the chromanes as component (e) and also, where appropriate, other compounds selected from the group of components (d) and (f).

Other preferred stabilizer mixtures comprise, besides components (a) and (b), at least one compound selected from the group consisting of sterically hindered phenols as component (c), and at least one organic or inorganic salt selected from the group consisting of zinc salts, calcium salts, magnesium salts, cerium salts, iron salts, and manganese salts, as component (f), and also, where appropriate other compounds selected from the group of components (d) and (e).

Other preferred stabilizer mixtures comprise, besides components (a) and (b), at least one compound selected from the group consisting of sterically hindered amines as component (d), and at least one compound selected from the group of the chromanes as component (e), and also, where appropriate, other compounds selected from the group of components (c) and (f).

Other preferred stabilizer mixtures comprise, besides components (a) and (b), at least one compound selected from the group consisting of sterically hindered amines as component (d), and at least one organic or inorganic salt selected from the group consisting of zinc salts, calcium salts, magnesium salts, cerium salts, iron salts, and manganese salts as component (f), and also, where appropriate, other compounds selected from the group of components (c) and (e).

Other preferred stabilizer mixtures comprise, besides components (a) and (b), at least one compound selected from the group of the chromanes as component (e), and at least one organic or inorganic salt selected from the group consisting of zinc salts, calcium salts, magnesium salts, cerium salts, iron salts, and manganese salts, as component (f), and also, where appropriate, other compounds selected from the group of components (c) and (d).

Other preferred stabilizer mixtures comprise, besides components (a) and (b), at least one compound selected from the group consisting of sterically hindered phenols as component (c), at least one compound selected from the group consisting of sterically hindered amines as component (d), and at least one compound selected from the group of the chromanes as component (e), and also, where appropriate, other compounds of component (f).

Other preferred stabilizer mixtures comprise, besides components (a) and (b), at least one compound selected from the group consisting of sterically hindered phenols as component (c), at least one compound selected from the group consisting of sterically hindered amines as component (d), and at least one organic or inorganic salt selected from the group consisting of zinc salts, calcium salts, magnesium salts, cerium salts, iron salts, and manganese salts as component (f), and also, where appropriate other compounds of component (e).

It is, of course, also possible for the polymers to receive additions of undiluted UV absorbers, i.e. UV absorbers not embedded within a polymer matrix or partially or completely encapsulated by a polymer matrix, alongside the polymer powders comprising UV absorbers, and/or for the stabilizer mixtures of the invention to additionally comprise straight UV absorbers, for example those listed at the outset.

The stabilizer mixtures of the invention may moreover comprise other stabilizers (costabilizers), selected from the groups listed below.

1. Antioxidants and free-radical scavengers 1.1 Alkylated monophenols, for example: 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-($\alpha$-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols having linear or branched alkyl chains, such as 2,6-dinonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol; and their mixtures.

1.2 Alkylthiomethylphenols, for example: 2,4-dioctylthiomethyl-6-tert-butylphenol; 2,4-dioctylthiomethyl-6-methylphenol; 2,4-dioctylthiomethyl-6-ethylphenol; 2,6-didodecylthiomethyl-4-nonylphenol.

1.3 Hydroquinones and alkylated hydroquinones, for example: 2,6-di-tert-butyl-4-methoxyphenol; 2,5-di-tert-butylhydroquinone; 2,5-di-tert-amylhydroquinone; 2,6-diphenyl-4-octadecyloxyphenol; 2,6-di-tert-butylhydroquinone; 2,5-di-tert-butyl-4-hydroxyanisole; 3,5-di-tert-butyl-4-hydroxyanisole; 3,5-di-tert-butyl-4-hydroxyphenyl stearate; bis(3,5-di-tert-butyl-4-hydroxyphenyl)adipate.

1.4 Tocopherols, for example: $\alpha$-tocopherol, $\beta$-tocopherol, $\gamma$-tocopherol, $\delta$-tocopherol and their mixtures (vitamin E).

1.5 Hydroxylated thiodiphenyl ethers, for example: 2,2'-thiobis(6-tert-butyl-4-methylphenol); 2,2'-thiobis(4-octylphenol); 4,4'-thiobis(6-tert-butyl-3-methylphenol); 4,4'-thiobis(6-tert-butyl-2-methylphenol); 4,4'-thiobis(3,6-di-sec-amylphenol); 4,4'-bis(2,6-dimethyl-4-hydroxyphenyl)disulfide.

1.6 Alkylidenebisphenols, for example: 2,2'-methylenebis(6-tert-butyl-4-methylphenol); 2,2'-methylenebis(6-tert-butyl-4-ethylphenol); 2,2'-methylenebis[4-methyl-6-($\alpha$-methylcyclohexyl)phenol]; 2,2'-methylenebis(4-methyl-6-cyclohexylphenol); 2,2'-methylenebis(6-nonyl-4-methylphenol); 2,2'-methylenebis(4,6-di-tert-butylphenol); 2,2'-ethylidenebis(4,6-di-tert-butylphenol); 2,2'-ethylidenebis(6-tert-butyl-4-isobutylphenol); 2,2'-methylenebis[6-($\alpha$-methylbenzyl)-4-nonylphenol]; 2,2'-methylenebis[6-($\alpha,\alpha$-dimethylbenzyl)-4-nonylphenol]; 4,4'-methylenebis(2,6-di-tert-butylphenol); 4,4'-methylenebis(6-tert-butyl-2-methylphenol); 1,1-bis(5-tert-butyl-4-hydroxy-2-methylphenyl)butane; 2,6-bis(3-tert-butyl-5-methyl-2-hydroxybenzyl)-4-methylphenol; 1,1,3-tris(5-tert-butyl-4-hydroxy-2-methylphenyl)butane; 1,1-bis(5-tert-butyl-4-hydroxy-2-methylphenyl)-3-n-dodecyl-mercaptobutane; ethylene glycol bis[3,3-bis(3'-tert-butyl-4'-hydroxyphenyl)butyrate]; bis(3-tert-butyl-4-hydroxy-5-methylphenyl)dicyclopentadiene; bis[2-(3'-tert-butyl-2'-hydroxy-5'-methylbenzyl)-6-tert-butyl-4-methylphenyl] terephthalate; 1,1-bis(3,5-dimethyl-2-hydroxyphenyl)butane; 2,2-bis(3,5-di-tert-butyl-4-hydroxyphenyl)propane; 2,2-bis(5-tert-butyl-4-hydroxy-2-methylphenyl)-4-n-dodecylmercaptobutane; 1,1,5,5-tetra-(5-tert-butyl-4-hydroxy-2-methylphenyl)pentane.

1.7 Benzyl compounds containing oxygen, nitrogen, or sulfur, for example: 3,5,3',5'-tetra-tert-butyl-4,4'-dihydroxydibenzyl ether; octadecyl 4-hydroxy-3,5-dimethylbenzylmercaptoacetate; tridecyl 4-hydroxy-3,5-di-tert-butylbenzylmercaptoacetate; tris(3,5-di-tert-butyl-4-hydroxybenzyl)amine; bis(4-tert-butyl-3-hydroxy-2,6-dimethylbenzyl)dithioterephthalate; bis(3,5-di-tert-butyl-4-hydroxybenzyl)sulfide; isooctyl 3,5-di-tert-butyl-4-hydroxybenzylmercaptoacetate.

1.8 Hydroxybenzylated malonates, for example: dioctadecyl 2,2-bis(3,5-di-tert-butyl-2-hydroxybenzyl)malonate; dioctadecyl 2-(3-tert-butyl-4-hydroxy-5-methylbenzyl)malonate; didodecyl mercaptoethyl-2,2-bis(3,5-di-tert-butyl-4-hydroxybenzyl)malonate; bis[4-(1,1,3,3-tetramethylbutyl)phenyl]2,2-bis(3,5-di-tert-butyl-4-hydroxybenzyl)malonate.

1.9 Aromatic hydroxybenzyl compounds, for example: 1,3,5-tris(3,5-di-tert-butyl-4-hydroxybenzyl)-2,4,6-trimethylbenzene; 1,4-bis(3,5-di-tert-butylhydroxybenzyl)-2,3,5,6-tetramethylbenzene; 2,4,6-tris(3,5-di-tert-butyl-4-hydroxybenzyl)phenol.

1.10 Triazine compounds, for example: 2,4-bisoctylmercapto-6-(3,5-di-tert-butyl-4-hydroxyanilino)-1,3,5-triazine; 2-octylmercapto-4,6-bis(3,5-di-tert-butyl-4-hydroxyanilino)-1,3,5-triazine; 2-octylmercapto-4,6-bis(3,5-di-tert-butyl-4-hydroxyphenoxy)-1,3,5-triazine; 2,4,6-tris(3,5-di-tert-butyl-4-hydroxyphenoxy)-1,2,3-triazine; 1,3,5-tris(3,5-di-tert-butyl-4-hydroxybenzyl) isocyanurate; 1,3,5-tris(4-tert-butyl-3-hydroxy-2,6-dimethylbenzyl) isocyanurate; 2,4,6-tris(3,5-di-tert-butyl-4-hydroxyphenylethyl)-1,3,5-triazine; 1,3,5-tris(3,5-di-tert-butyl-4-hydroxyphenylpropionyl)-hexahydro-1,3,5-triazine; 1,3,5-tris(3,5-dicyclohexyl-4-hydroxybenzyl)isocyanurate.

1.11 Benzylphosphonates, for example: dimethyl 2,5-di-tert-butyl-4-hydroxybenzylphosphonate; diethyl 3,5-di-tert-butyl-4-hydroxybenzylphosphonate; dioctadecyl 3,5-di-tert-butyl-4-hydroxybenzylphosphonate; dioctadecyl 5-tert-butyl-4-hydroxy-3-methylbenzylphosphonate; the calcium salts of the monoethyl ester of 3,5-di-tert-butyl-4-hydroxybenzylphosphonic acid.

1.12 Acylaminophenols, for example: 4-hydroxylauranilide; 4-hydroxystearanilide; octyl N-(3,5-di-tert-butyl-4-hydroxyphenyl)carbamate.

1.13 Esters of $\beta$-(3,5-di-tert-butyl-4-hydroxyphenyl)propionic acid with mono- or polyhydric alcohols, for example: methanol; ethanol; n-octanol; isooctanol; octadecanol; 1,6-hexanediol; 1,9-nonanediol; ethylene glycol; 1,2-propanediol; neopentyl glycol; thiodiethylene glycol; diethylene glycol; triethylene glycol; pentaerythritol; tris(hydroxyethyl)isocyanurate; N,N'-bis(hydroxyethyl)oxalamide; 3-thiaundecanol; 3-thiapentadecanol; trimethylhexanediol; trimethylolpropane; 4-hydroxymethyl-1-phospha-2,6,7-trioxabicyclo[2.2.2]octane.

1.14 Esters of $\beta$-(5-tert-butyl-4-hydroxy-3-methylphenyl) propionic acid with mono- or polyhydric alcohols, for example: methanol; ethanol; n-octanol; isooctanol; octadecanol; 1,6-hexanediol; 1,9-nonanediol; ethylene glycol; 1,2-propanediol; neopentyl glycol; thiodiethylene glycol; diethylene glycol; triethylene glycol; pentaerythritol; tris(hydroxyethyl)isocyanurate; N,N'-bis(hydroxyethyl)oxalamide; 3-thiaundecanol;

3-thiapentadecanol; trimethylhexanediol; trimethylolpropane; 4-hydroxymethyl-1-phospha-2,6,7-trioxabicyclo[2.2.2]octane.

1.15 Esters of β-(3,5-dicyclohexyl-4-hydroxyphenyl)propionic acid with mono- or polyhydric alcohols, for example: methanol; ethanol; n-octanol; isooctanol; octadecanol; 1,6-hexanediol; 1,9-nonanediol; ethylene glycol; 1,2-propanediol; neopentyl glycol; thiodiethylene glycol; diethylene glycol; triethylene glycol; pentaerythritol; tris(hydroxyethyl)isocyanurate; N,N'-bis(hydroxyethyl)oxalamide; 3-thiaundecanol; 3-thiapentadecanol; trimethylhexanediol; trimethylolpropane; 4-hydroxymethyl-1-phospha-2,6,7-trioxabicyclo[2.2.2]octane.

1.16 Esters of 3,5-di-tert-butyl-4-hydroxyphenylacetic acid with mono- or polyhydric alcohols, for example: methanol; ethanol; n-octanol; isooctanol; octadecanol; 1,6-hexanediol; 1,9-nonanediol; ethylene glycol; 1,2-propanediol; neopentyl glycol; thiodiethylene glycol; diethylene glycol; triethylene glycol; pentaerythritol; tris(hydroxyethyl)isocyanurate; N,N'-bis(hydroxyethyl)oxalamide; 3-thiaundecanol, 3-thiapentadecanol; trimethylhexanediol; trimethylolpropane; 4-hydroxymethyl-1-phospha-2,6,7-trioxabicyclo[2.2.2]octane.

1.17 Amides of β-(3,5-di-tert-butyl-4-hydroxyphenyl)propionic acid, for example: N,N'-bis(3,5-di-tert-butyl-4-hydroxyphenylpropionyl)hexamethylenediamine; N,N'-bis(3,5-di-tert-butyl-4-hydroxyphenylpropionyl)trimethylenediamine; N,N'-bis(3,5-di-tert-butyl-4-hydroxyphenylpropionyl)-hydrazine; N,N'-bis[2-(3-[3,5-di-tert-butyl-4-hydroxyphenyl]propionyloxy)ethyl] oxalamide (Naugard® XL-1 from Uniroyal).

1.18 Ascorbic acid and derivatives, such as vitamin C and palmitol ascorbate.

1.19 Amine antioxidants, for example: N,N'-diisopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-dicyclohexyl-p-phenylenediamine; N,N'-diphenyl-p-phenylenediamine; N,N'-bis(2-naphthyl)-p-phenylenediamine; N-isopropyl-N'-phenyl-p-phenylenediamine; N-(1,3-dimethylbutyl)-N'-phenyl-p-phenylenediamine; N-(1-methylheptyl)-N'-phenyl-p-phenylenediamine; N-cyclohexyl-N'-phenyl-p-phenylenediamine; 4-(p-toluenesulfonamoyl)diphenylamine; N,N'-dimethyl-N,N'-di-sec-butyl-p-phenylenediamine; diphenylamine; N-allyldiphenylamine; 4-isopropoxydiphenylamine; N-phenyl-1-naphthylamine; N-(4-tert-octylphenyl)-1-naphthylamine; N-phenyl-2-naphthylamine; dioctylphenylamines; for example p,p'-(di-tert-octylphenyl)amine; 4-n-butylaminophenol; 4-butyrylaminophenol; 4-nonanoylaminophenol; 4-dodecanoylaminophenol; 4-octadecanoylaminophenol; bis(4-methoxyphenyl)amine; 2,6-di-tert-butyl-4-dimethylaminomethylphenol; 2,4'-diaminodiphenylmethane; 4,4'-diaminodiphenylmethane; N,N,N',N'-tetramethyl-4,4'-diaminodiphenylmethane; 1,2-bis[(2-methylphenyl)amino]ethane; 1,2-bis(phenylamino)propane; bis[4-(1',3'-dimethylbutyl)phenyl]amine, mixtures of mono- and dialkylated tert-butyl/tert-octyldiphenylamines; mixtures of mono- and dialkylated nonyldiphenylamines; mixtures of mono- and dialkylated dodecyldiphenylamines; mixtures of mono- and dialkylated isopropyl/isohexyl-diphenylamines; mixtures of mono- and dialkylated tert-butyldiphenylamine; 2,3-dihydro-3,3-dimethyl-4H-1,4-benzothiazine, phenothiazine; mixtures of mono- and dialkylated tert-butyl/tert-octylphenothiazines; mixtures of mono- and dialkylated tert-octylphenothiazines; N-allylphenothiazine; N,N,N',N'-tetraphenyl-1,4-diaminobut-2-ene; N,N-bis(2,2,6,6-tetramethylpiperidin-4-yl)hexamethylenediamine; bis(2,2,6,6-tetramethylpiperidin-4-yl)sebacate; 2,2,6,6-tetramethylpiperidin-4-one; 2,2,6,6-tetramethylpiperidin-4-ol.

1.20 Benzofuranones and indolinones, for example: the compounds disclosed in the specifications U.S. Pat. No. 4,325,863, U.S. Pat. No. 4,338,244, U.S. Pat. No. 5,175,312, U.S. Pat. No. 5,216,052, U.S. Pat. No. 5,252,643, DE 43 16 611 A1, DE 43 16 622 A1, DE 43 16 876 A1, EP 589 839 A1 and EP 591 102 A1, 3-[4-(2-acetoxyethoxy)phenyl]-5,7-di-tert-butylbenzofuran-2-one; 3-[4-(2-(stearoyloxyethoxy)phenyl]-5,7-di-tert-butyl-benzofuran-2-one; 3,3'-bis[5,7-di-tert-butyl-3-(4-[2-hydroxyethoxy]phenyl)-benzofuran-2-one; 5,7-di-tert-butyl-3-(4-ethoxyphenyl)benzofuran-2-one; 3-(4-acetoxy-3,5-dimethylphenyl)-5,7-di-tert-butylbenzofuranon-2-one; 3-(3,5-dimethyl-4-pivaloyloxyphenyl)-5,7-di-tert-butylbenzofuran-2-one; in particular the compound of the formula

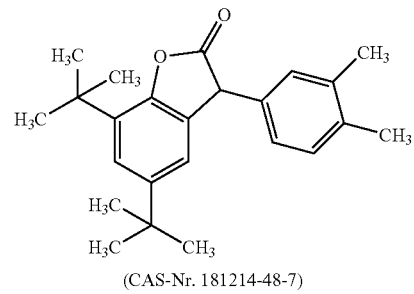 [SMILES: Cc1ccc(C2C(=O)Oc3c2cc(C(C)(C)C)cc3C(C)(C)C)cc1C]

(CAS-Nr. 181214-48-7)

1.21 Compounds of the formulae:

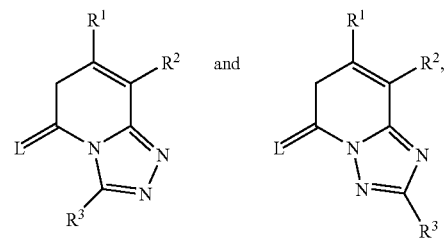

and their tautomers of the formulae

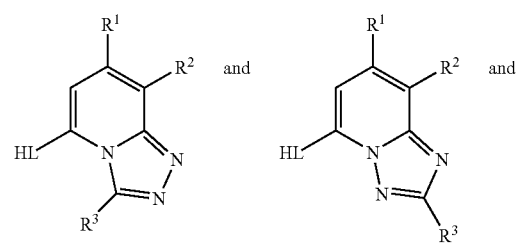

-continued

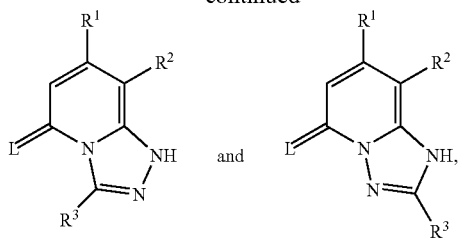

where
R² is L' or a —(R₂N)C=C(L')₂ group, where the two radicals R and L', respectively, may be identical or different from one another; L' is —CN, —COR, —COOR, —SO₂R; L is oxygen, =NR or sulfur; and R¹, R³, and R, independently of one another, are hydrogen; linear or branched $C_1$-$C_{24}$-alkyl; linear or branched $C_2$-$C_{24}$-alkenyl; linear or branched $C_2$-$C_{24}$-alkynyl; linear or branched $C_2$-$C_8$-alkoxyalkyl; unsubstituted or substituted $C_3$-$C_{12}$-cycloalkyl; an unsubstituted or substituted five- or six-membered heterocyclic radical which contains at least one heteroatom selected from the group consisting of oxygen, nitrogen and sulfur; unsubstituted or substituted $C_6$-$C_{20}$-aryl.

The preparation of these compounds is described by way of example in the specification WO 95/04733, and their use as a component of stabilizer mixtures for polymers is known from the earlier German Patent Application 102 50 260.9.

2. Other UV absorbers and light stabilizers
   2.1 Nickel compounds, for example: nickel complexes of 2,2'-thiobis[4-(1,1,3,3-tetramethylbutyl)phenol], such as the 1:1 or 1:2 complex, with or without additional ligands such as n-butylamine; triethanolamine or N-cyclohexyldiethanolamine; nickel dibutyldithiocarbamate; nickel salts of monoalkyl esters; for example of methyl or ethyl ester; of 4-hydroxy-3,5-di-tert-butyl-benzylphosphonic acid; nickel complexes with ketoximes; e.g. with 2-hydroxy-4-methylphenyl undecyl ketoxime; nickel complexes of 1-phenyl-4-lauroyl-5-hydroxypyrazole; with or without additional ligands.
   2.2 Other sterically hindered amines and their N-alkoxy derivatives, for example: the condensation product of 1-(2-hydroxyethyl)-2,2,6,6-tetra-4-hydroxypiperidine and succinic acid, the linear or cyclic condensation product of N,N'-bis(2,2,6,6-tetramethyl-4-piperidinyl)hexamethylenediamine and 4-tert-octylamino-2,6-dichloro-1,3,5-s-triazine, tris(2,2,6,6-tetramethyl-4-piperidinyl)nitrilotriacetate, tetrakis(2,2,6,6-tetramethyl-4-piperidinyl) 1,2,3,4-butanetetracarboxylate, 1,1'-(1,2-ethanediyl)-bis(3,3,5,5-tetramethylpiperazinone, the linear or cyclic condensation product of N,N'-bis(2,2,6,6-tetramethyl-4-piperidinyl)hexamethylenediamine and 4-morpholine-2,6-dichloro-1,3,5-triazine, the condensation product of 2-chloro-4,6-di(4-n-butylamino-2,2,6,6-tetramethylpiperidinyl)-1,3,5-triazine and 1,2-bis(3-aminopropylamino)ethane, the condensation product of 2-chloro-4,6-di(4-n-butylamino-1,2,2,6,6-pentamethyl-piperidinyl)-1,3,5-triazine and 1,2-bis(3-aminopropylamino)-ethane, 3-dodecyl-1-(1,2,2,6,6-pentamethyl-4-piperidinyl)-pyrrolidin-2,5-dione, a mixture of 4-hexadecyloxy- and 4-stearyloxy-2,2,6,6-tetramethylpiperidine, the condensation product of N—N'-bis(2,2,6,6-tetramethyl-4-piperidinyl)-hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine (CAS Reg. No. [136504-96-6], N-(2,2,6,6-tetramethyl-4-piperidinyl)-n-dodecylsuccinimide, N-(1,2,2,6,6-pentamethyl-4-piperidinyl)-n-dodecylsuccinimide, the reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidinyloxycarbonyl)-2-(4-methoxyphenyl)ethene, the diester of 2-methoxymethylenemalonic acid with 1,2,2,6,6-pentamethyl-4-hydroxypiperidine.
   2.3 Oxamides, for example: 4,4'-dioctyloxyoxanilide; 2,2'-diethoxyoxanilide; 2,2'-dioctyloxy-5,5'-di-tert-butoxanilide; 2,2'-didodecyloxy-5,5'-di-tert-butyloxanilide; 2-ethoxy-2'-ethyloxanilide; N,N'-bis(3-dimethylaminopropyl)-oxamide; 2-ethoxy-5-tert-butyl-2'-ethoxanilide and its mixtures with 2-ethoxy-2'-ethyl-5,4'-di-tert-butoxanilide; and mixtures of disubstituted ortho- and para-methoxyoxanilides, and mixtures of disubstituted ortho- and para-ethoxyoxanilides.

3. "Metal deactivators", for example: N,N'-diphenyloxamide; N-salicylal-N'-salicyloylhydrazine; N,N'-bis(salicyloyl)-hydrazine; N,N'-bis(3,5-di-tert-butyl-4-hydroxyphenylpropionyl)hydrazine; 3-salicyloylamino-1,2,4-triazole; bis(benzylidene)oxalyl dihydrazide; oxanilide; isophthaloyl dihydrazide; sebacoyl bisphenylhydrazide; N,N'-diacetyladipoyl dihydrazide; N,N'-bis(salicyloyl) oxalyl dihydrazide; N,N'-bis(salicyloyl)thiopropionyl dihydrazide.

4. Hydroxylamines, for example: N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; N,N-dialkylhydroxylamines derived from hydrogenated tall amines.

5. Nitrones, for example: N-benzyl-α-phenylnitrone; N-ethyl-α-methylnitrone; N-octyl-α-heptylnitrone; N-lauryl-α-undecylnitrone; N-tetradecyl-α-tridecylnitrone; N-hexadecyl-α-pentadecylnitrone; N-octadecyl-α-heptadecylnitrone; N-hexadecyl-α-heptadecylnitrone; N-octadecyl-α-pentadecylnitrone; N-heptadecyl-α-heptadecylnitrone; N-octadecyl-α-hexadecylnitrone; a nitrone derived from hydrogenated tall amines.

6. Thiosynergists, for example: dilauryl thiodipropionate; distearyl thiodipropionate.

7. Agents capable of destroying peroxides, for example: esters of β-thiodipropionic acid, for example the lauryl; stearyl; myristyl or tridecyl ester; mecaptobenzimidazole; or the zinc salt of 2-mercaptobenzimidazole; zinc dibutyldithiocarbamate; dioctadecyl disulfide; pentaerythritol tetrakis(β-dodecylmercapto)propionate.

8. Polyamide stabilizers, for example: copper salts in combination with compounds of iodine and/or of phosphorus, other examples being salts of divalent manganese.

9. Basic costabilizers, for example: melamine, polyvinylpyrrolidone, dicyandiamide, triallyl cyanurate, urea derivatives, hydrazine derivatives, amines, polyamides, polyurethanes, the alkali metal and alkaline earth metal salts of high-molecular-weight fatty acids, for example calcium stearate, zinc stearate, magnesium stearate, magnesium behenate, sodium ricinoleate, potassium palmitate, antimony pyrocatecholate, tin pyrocatecholate, zinc pyrocatecholate.

10. Nucleating agents, for example: inorganic substances, examples being talc, metal oxides, (such as titanium dioxide or magnesium oxide), phosphates, carbonates or sulfates (preferably of the alkaline earth metals); organic compounds, such as mono- or polycarboxylic acids and also their salts, (for example 4-tert-butylbenzoic acid, adipic acid; diphenylacetic acid; sodium succinate or sodium benzoate); polymeric compounds, such as ionic copolymers ("ionomers").

11. Fillers and reinforcing agents, for example: calcium carbonate, silicates, glass fibers, glass beads, talc, kaolin, mica, barium sulfate, metal oxides and metal hydroxides, carbon black, graphite, wood flour and other powders or fibers of other natural products, synthetic fibers.

12. Other additives, for example: plasticizers, dyes, pigments, lubricants, emulsifiers, rheological additives, catalysts, leveling assistants, optical brighteners, flame retardants, antistatic agents, blowing agents.

Where appropriate, from 0.01 to 10% by weight of the abovementioned stabilizers (costabilizers), based on the weight of the polymers to be stabilized, may be added to the polymers to be stabilized.

Where appropriate, from 0.01 to 40% by weight of the fillers and reinforcing agents described under item 11, such as talc, calcium carbonate, mica, or kaolin, based on the weight of the polymers to be stabilized, may be added to the polymers to be stabilized.

Where appropriate, from 0.01 to 60% by weight of the fillers and reinforcing agents described under item 11, such as metal hydroxides, in particular aluminum hydroxide or magnesium hydroxide, based on the weight of the polymers to be stabilized, may be added to the polymers to be stabilized.

Where appropriate, from 0.01 to 5% by weight of carbon black filler, based on the weight of the polymers to be stabilized, may be added to the polymers to be stabilized.

Where appropriate, from 0.01 to 20% by weight of the reinforcing agent glass fibers, based on the weight of the polymers to be stabilized, may be added to the polymers to be stabilized.

Irrespective of whether the preferred embodiments are used, the present invention also provides a process for stabilizing polymers, in particular polyolefins, with respect to exposure to UV radiation, oxygen and heat, which comprises adding, to the polymers, an effective amount of stabilizer mixtures of the invention.

Components (a) and (b), and/or (c), and/or (d), and/or (e), and/or (f) are incorporated—individually or in a mixture with one another and, where appropriate, with other stabilizers (costabilizers)—into the polymers to be stabilized by methods known per se, e.g. prior to or during processing, or the stabilizer mixtures of the invention are dissolved or suspended in a solvent or suspension medium and added to the polymers to be stabilized prior to or after evaporation of the solvent or suspension medium. Masterbatches may also be prepared from the stabilizer mixtures of the invention, their content of these mixtures being from 2.5 to 25% by weight, based on the total weight of the masterbatch.

The stabilizer mixtures of the invention, where appropriate in the presence of other stabilizers (costabilizers), may be added, for example, after the polymerization process to the polymers to be stabilized, or else during the polymerization process, or prior to the crosslinking process.

The stabilizer mixtures of the invention, where appropriate in the presence of other stabilizers (costabilizers), may be in pure form, or else included within waxes, within oils, or within polymers, when added to the polymers to be stabilized.

Stabilizer mixtures of the invention, where appropriate in the presence of other stabilizers (costabilizers) capable of use in dissolved or molten form may also be sprayed into the polymers to be stabilized. This spray-addition process may advantageously be undertaken with the aid of the gas used to deactivate the polymerization catalyst, and together with the gas.

In the case of spherically polymerized polyolefins, it can be advantageous to spray the stabilizer mixtures of the invention jointly, where appropriate in the presence of other stabilizers (costabilizers).

The polymers stabilized according to the invention may be shaped in various ways, for example as films, fibers, tapes, melt compositions, profiles, or injection moldings.

We claim:

1. A method for stabilizing a polymer with respect to exposure to UV radiation comprising incorporating a fine-particle polymer powder comprising at least one UV absorber into a polymer,
wherein said fine-particle polymer powder further comprises at least one other component selected from the group consisting of: (b) at least one compound selected from the group consisting of organic phosphites, organic phosphines, and organic phosphonites, (c) at least one compound selected from the group consisting of sterically hindered phenols, (d) at least one compound selected from the group consisting of sterically hindered amines, (e) at least one compound selected from the group of the chromanes, and (f) at least one organic or inorganic salt selected from the group consisting of zinc salts, calcium salts, magnesium salts, cerium salts, iron salts and manganese salts.

2. The method as claimed in claim 1, wherein polymer particles of the fine-particle polymer powder have a particle size ≦500 nm.

3. The method as claimed in claim 1, wherein the fine-particle polymer powder comprises from 0.5 to 50% by weight of the at least one UV absorber, based on the weight of the polymer matrix.

4. The method for stabilizing a polymer as claimed in claim 1, wherein the polymer is a polyolefin.

5. A method for stabilizing a polymer with respect to exposure to UV radiation comprising incorporating a fine-particle polymer powder comprising at least one UV absorber into a polymer, wherein said polymer is at least one polymer selected from the group consisting of polypropylene, polyisobutylene, poly-1-butene, poly-4-methyl-1-pentene, polyisoprene, polybutadiene, polycyclopentene, polynorbonene, and polyethylene.

6. The method as claimed in claim 5, wherein polymer particles of the fine-particle polymer powder have a particle size ≦500 nm.

7. The method as claimed in claim 5, wherein the fine-particle polymer powder comprises from 0.5 to 50% by weight of the at least one UV absorber, based on the weight of the polymer matrix.

8. The method for stabilizing a polymer as claimed in claim 5, wherein the polymer is a polyolefin.

* * * * *